United States Patent
Hindie et al.

(10) Patent No.: US 6,490,628 B2
(45) Date of Patent: Dec. 3, 2002

(54) MODEM USING A DIGITAL SIGNAL PROCESSOR AND A SIGNAL BASED COMMAND SET

(75) Inventors: Amir Hindie, Austin, TX (US); Karl Leinfelder, Wake Forest, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/160,332

(22) Filed: Sep. 25, 1998

(65) Prior Publication Data

US 2001/0011213 A1 Aug. 2, 2001

(51) Int. Cl.$^7$ .......... G06F 9/00; G06F 15/173; G06F 3/00; H04B 1/38
(52) U.S. Cl. .......... 709/232; 709/100; 709/228; 709/233; 709/234; 709/230; 375/222; 710/10; 710/14; 710/29; 710/30; 703/24
(58) Field of Search .......... 709/228, 250, 709/232, 233, 234, 246; 703/22, 24, 21; 375/222; 710/8, 14, 51, 33, 29, 30, 10

(56) References Cited

U.S. PATENT DOCUMENTS

| | | | | |
|---|---|---|---|---|
| 4,077,021 A | * | 2/1978 | Csajka et al. | 332/103 |
| 4,355,388 A | * | 10/1982 | Deal, Jr. | 370/324 |
| 4,365,331 A | * | 12/1982 | Biba et al. | 370/445 |
| 4,549,302 A | * | 10/1985 | Heatherington | 375/222 |
| 4,644,561 A | * | 2/1987 | Paneth et al. | 375/223 |
| 4,665,519 A | * | 5/1987 | Kirchner et al. | 375/222 |
| 4,675,863 A | * | 6/1987 | Paneth et al. | 370/334 |
| 4,718,082 A | * | 1/1988 | Parker et al. | 375/222 |
| 4,742,482 A | * | 5/1988 | Inskeep et al. | 714/14 |
| 4,797,898 A | * | 1/1989 | Martinez | 375/219 |
| 4,890,316 A | * | 12/1989 | Walsh et al. | 379/93.33 |
| 4,891,806 A | * | 1/1990 | Farias et al. | 370/503 |
| 5,005,168 A | * | 4/1991 | Cummiskey et al. | 370/276 |
| 5,023,869 A | * | 6/1991 | Grover et al. | 370/421 |
| 5,119,403 A | * | 6/1992 | Krishnan | 375/261 |
| 5,146,472 A | * | 9/1992 | Hallman | 375/222 |
| 5,185,763 A | * | 2/1993 | Krishnan | 375/262 |
| 5,212,774 A | * | 5/1993 | Grider et al. | 710/129 |
| 5,222,077 A | * | 6/1993 | Krishnan | 375/261 |
| 5,313,580 A | * | 5/1994 | Remion | 710/105 |

(List continued on next page.)

FOREIGN PATENT DOCUMENTS

| | | | | |
|---|---|---|---|---|
| JP | 0227108 | * | 8/1989 | 375/222 |

OTHER PUBLICATIONS

ITU, Cirrus Logic, Inc., Patent Statement Nov. 26, 1997 for V.90.*
IBM Technical Disclosure Bulletin, NN8306261, Jun. 1983.*
Conklin Systems, Analysis on MOS, Dec. 26, 1990.*
Hyes Smartmodem OPTIMA, User's Guide 1992.*

*Primary Examiner*—Hugh M. Jones
*Assistant Examiner*—W. D. Thomson
(74) *Attorney, Agent, or Firm*—Blakely, Sokoloff, Taylor & Zafman LLP

(57) ABSTRACT

Modems are implemented using a language made of instructions or commands which are based on the types of signals needed to be generated or processed by the modem. That is, the commands are individually tailored to specify the signals to be sent or processed. The modems can be implemented on a digital signal processor or on a host. The language permits a terseness of expression resulting in smaller code, makes it easy to express the needed manipulations required for modem functionality and permits faster execution.

19 Claims, 26 Drawing Sheets

U.S. PATENT DOCUMENTS

| | | | | |
|---|---|---|---|---|
| 5,317,594 A | * | 5/1994 | Goldstein | 375/222 |
| 5,347,304 A | * | 9/1994 | Moura et al. | 348/12 |
| 5,384,780 A | * | 1/1995 | Lomp et al. | 341/61 |
| 5,418,778 A | * | 5/1995 | Cummiskey et al. | 370/291 |
| 5,446,759 A | * | 8/1995 | Campana, Jr. | 375/267 |
| 5,495,246 A | * | 2/1996 | Nichols et al. | 341/155 |
| 5,541,955 A | * | 7/1996 | Jacobsmeyer | 375/222 |
| 5,579,305 A | * | 11/1996 | Norrell et al. | 370/286 |
| 5,600,712 A | * | 2/1997 | Hanson et al. | 379/142 |
| 5,627,539 A | * | 5/1997 | Lynch et al. | 341/155 |
| 5,633,890 A | * | 5/1997 | Ahmed | 375/219 |
| 5,644,593 A | * | 7/1997 | Bailey et al. | 375/222 |
| 5,654,983 A | * | 8/1997 | Sauser, Jr. | 375/225 |
| 5,673,392 A | * | 9/1997 | Nakashima et al. | 708/203 |
| 5,687,222 A | * | 11/1997 | McLaughlin et al. | 375/222 |
| 5,694,428 A | * | 12/1997 | Campana, Jr. | 375/260 |
| 5,710,768 A | * | 1/1998 | Ziv et al. | 370/342 |
| 5,719,922 A | * | 2/1998 | Bremer et al. | 379/88 |
| 5,727,233 A | * | 3/1998 | Lynch et al. | 710/65 |
| 5,734,676 A | * | 3/1998 | Dingsor | 375/222 |
| 5,742,641 A | * | 4/1998 | Dingsor | 375/222 |
| 5,742,644 A | * | 4/1998 | Campana, Jr. | 375/316 |
| 5,761,240 A | * | 6/1998 | Croucher, Jr. | 375/224 |
| 5,784,597 A | * | 7/1998 | Chiu et al. | 713/401 |
| 5,870,429 A | * | 2/1999 | Moran, III et al. | 375/222 |
| 5,872,810 A | * | 2/1999 | Philips et al. | 375/222 |
| 5,905,476 A | * | 5/1999 | McLaughlin et al. | 345/1 |
| 5,946,348 A | * | 8/1999 | Mizutani et al. | 375/222 |
| 5,982,814 A | * | 11/1999 | Yeh et al. | 375/222 |
| 5,991,634 A | * | 11/1999 | Hui et al. | 375/222 |
| 6,138,190 A | | 10/2000 | Nording | |

* cited by examiner

MNEMONIC {SIGNAL TABLE INDEX, ONE OR MORE PARAMETERS}

*FIG. 22*

HIGH LEVEL STATE MACHINE COMMANDS

```
// Tx or Rx a signal for a fixed # of symbols  NO SYNCHRONIZATION
SYMBOL_CNT =      0x0000; // iiii iiii iiii iiii : 000n nnnn nnnn nnnn           FIXED_COUNT
    // I = signal tables index
    // n = number of symbols // Tx or Rx a signal of a fixed # of symbols once or until synchronized to
// state index s of the other channel
FIXED_LENGTH =    0x2000; // iiii iiii iiii iiii : 0010 0sss ssss ssss           FIXED_LEN_UNTIL
    // I = signal tables index
    // S = index to sequencer state to synchronize to
    // S = 0 for send signal only once
    // RoTrSequenceLengthTbl holds # of bits in signal // Rx until a signal is matched
UNTIL_MATCH =     0x27ff; // iiii iiii iiii iiii : 0010 0111 1111 1111           UNTIL
    // I = signal table index                              TrSeqBitCnt = &RoTrSequenceLengthTbl + I
// Tx or Rx a signal for a variable # of symbols + # of round trip delays
VARIABLE_TIME =   0x2800; // iiii iiii iiii iiii : 0010 1rrx xxxx xxxx           VAR_LEN_UNTIL
    // I = signal tables index
    // R = # round trip delays
    // r0->TrComputedDuration holds the time in symbols // Tx or Rx a signal of a variable # of symbols once or until synchronized to
// state index s of the other channel
VARIABLE_LENGTH = 0x3000; // iiii iiii iiii iiii : 0011 0sss ssss ssss           VAR_LEN_UNTIL
    // I = signal tables index
    // S = index to sequencer state to synchronize to
    // S = 0 for send signal only once
    // r0->TrComputedDuration holds the time in symbols // Tx or Rx a signal for a fixed # mSeconds + # of round trip delays
FIXED_TIME =      0x4000; // iiii iiii iiii iiii : 01rr tttt tttt tttt           FIXED_TIME
    // I = signal tables index
    // R = # round trip delays
    // T = time in seconds // Call routine in table and set Rf with parameter
CALL =            0x8000; // pppp pppp pppp pppp : 1000 xxxx xxcc cccc           CALL
    // P = parameter to be placed in Rf
    // C = index into call address table (&TrCallIndirectTbl) in TrEncDec.asp // Set Variable (Hi or Lo) with 16 bit parameter
TR_SET_PARAM_LO = 0x9000; // pppp pppp pppp pppp : 1001 mmmm mmvv vvvv           SET_PARM_LO
TR_SET_PARAM_HI = 0xb000; // pppp pppp pppp pppp : 1011 mmmm mmvv vvvv           SET_PARM_HI
    // P = parameter to be written
    // M specifies the MPB structure the variable is in
    // This structure is determines by an offset into the SqSeqMpB
    // V specifies the variable // Set Rx timeout timer with # of msec + # of round trip delays
mSECS_TIMEOUT =   0xC000; // 0ttt tttt tttt tttt : 11rr iiii iiii iiii           MSEC_TIMEOUT
    // T = time in mSeconds
    // R = # round trip delays
    // I = Rx timeout index = r1-> TrRxTimeoutIdx
    // r1->TrRxTimeoutCtr = t+r in # symbols
```

FIG. 23

MODEM USING A DIGITAL SIGNAL PROCESSOR AND A SIGNAL BASED COMMAND SET

CROSS-REFERENCES TO RELATED APPLICATIONS

This application is related to U.S. patent application Ser. No. 08/832,622 filed Mar. 31, 1997, by inventors Jim Bader, Scott Deans, Rob Miller, Richard P. Tarquini, Bankim Wani and Jack Waters, entitled "CONTROLLERLESS MODEM".

This application is related to U.S. patent application Ser. No. 08/775,769 filed Dec. 31, 1996, by inventor Guozhu Long, entitled "PRECODING COEFFICIENT TRAINING IN A V.34 MODEM", It is also related to:

U.S. patent application Ser. No. 09/160,576, filed Sep. 25, 1998, by inventors Amir Hindie and Karl Leinfelder, and entitled "MODEM USING A DIGITAL SIGNAL PROCESSOR AND SIMPLIFIED EXECUTION CODE."

U.S. patent application Ser. No. 09/160,578, filed Sep. 25, 1998, by inventors Amir Hindie and Karl Leinfelder, and entitled "MODEM USING A DIGITAL SIGNAL PROCESSOR AND SEPARATE TRANSMIT AND RECEIVE SEQUENCERS."

U.S. patent application Ser. No. 09/160,571, filed Sep. 25, 1998, by inventors Amir Hindie and Karl Leinfelder, and entitled "A MODEM USING BATCH PROCESSING OF SIGNAL SAMPLES."

U.S. patent application Ser. No. 09/160,570, filed Sep. 25, 1998, by inventors Amir Hindie and Karl Leinfelder, and entitled "A MODEM WITH CODE EXECUTION ADAPTED TO SYMBOL RATE."

U.S. patent application Ser. No. 09/160,569, filed Sep. 25, 1998, by inventors Wesley Smith, Karl Nordling, Amir Hindie, Karl Leinfelder, Sebastian Gracias and Jim Beaney, and entitled "INTEGRATED AUDIO AND MODEM DEVICE."

U.S. patent application Ser. No. 09/160,331, filed Sep. 25, 1998, by inventors Sebastian Gracias and Jim Beaney, and entitled "CODE SWAPPING TECHNIQUES FOR A MODEM IMPLEMENTED ON A DIGITAL SIGNAL PROCESSOR."

U.S. patent application Ser. No. 09/160,572, filed Sep. 25, 1998, by inventors David Pearce, Wesley Smith, Karl Nordling, Amir Hindie, Karl Leinfelder, Sebastian Gracias and Jim Beaney, and entitled "A MULTI-MODEM IMPLEMENTATION WITH HOST BASED AND DIGITAL SIGNAL PROCESSOR BASED MODEMS."

U.S. patent application Ser. No. 09/160,587, filed Sep. 25, 1998, by inventors Guozhu Long and Jim Beaney, and entitled "SYNCHRONIZATION TECHNIQUES USING AN INTERPOLATION FILTER."

U.S. patent application Ser. No. 09/160,577, filed Sep. 25, 1998, by inventors Guozhu Long and Jim Beaney, and entitled "A MODEM WITH A FAST GAIN TRACKER."

U.S. patent application Ser. No. 09/160,538, filed Sep. 25, 1998, by inventor Jim Beaney, and entitled "A TONE DETECTOR FOR USE IN A MODEM."

BACKGROUND OF THE INVENTION

1. Field of the Invention

The invention relates to communication modems and more particularly to modems implemented using a Digital Signal Processor having a signal based command set.

2. Description of Related Art

The use of modems to transmit digital signals across an analog channel, such as a telephone line, is well known in the art. Modem capabilities and performance have increased dramatically as the digital technology utilized to handle information has exploded with a variety of new applications and with large quantities of content. This technology explosion has resulted in increasing complexity for modems required to handle increasingly complex protocols.

Recent generations of modems utilize different signaling rates at different times or stages during their operation. Typically, a modem utilizes a dedicated processor or controller to carry out the operations required for modem transmission and reception. Software which drives such dedicate processors is often convoluted, containing many branches and jumps. Frequently, the dedicated modem processor is controlled by a sequencer implemented as a finite state machine. The state of the finite state machine changes as samples arrive and are sent in such a way as to implement the modem functionality. Typically, incoming signals from an analog channel are sampled by an analog to digital coder/decoder (codec) and signal samples are processed as they arrive from the codec. This imposes certain demanding real time performance requirements since processing of a given sample must be completed by the time the next sample arrives.

Incoming signal levels to a modem are often adjusted by an automatic gain control (AGC) circuit. However, incoming signals are often subject to a line "hit" which causes a momentary deviation from the desired gain level which cannot be compensated for by the AGC circuit.

Controllerless modems are also known which run as a separate process on the host which they service. An example of such a controllerless modem is shown in the referenced copending application.

Modern computers are processing real time audio in digital form more and more frequently. This audio processing can take the form of, for example, telephone applications, stored audio files, audio files accompanying real time motion images and the like. Often, this processing is ongoing at the same time as modem functions are occurring.

Digital signal processors are also known. These are relatively memory limited devices which are designed for high performance processing of digital signals. They typically operate as an adjunct to the host processor and can be configured to receive and handle processing assignments from the host computer and then return the results either to the host or to a memory location specified by the host. Digital signal processors are now available which handle multiple streams of digital signals.

A variety of techniques are used to adjust the timing of two digital signal streams so that important events from both streams coincide in time. These techniques are called synchronization techniques. Frequently, synchronization is required when undertaking modem applications or digital signal processing applications.

BRIEF SUMMARY OF THE INVENTION

The invention is directed to modems which have an instruction or command set that is individually tailored to specifying the signals to be handled by the modem.

BRIEF DESCRIPTION OF THE DRAWINGS

FIG. 22 is an illustration of an exemplary sample command format used in accordance with one aspect of the invention.

FIG. 23 is a list of commands used in carrying out one aspect of the invention.

DESCRIPTION OF THE INVENTION

Figure 1:
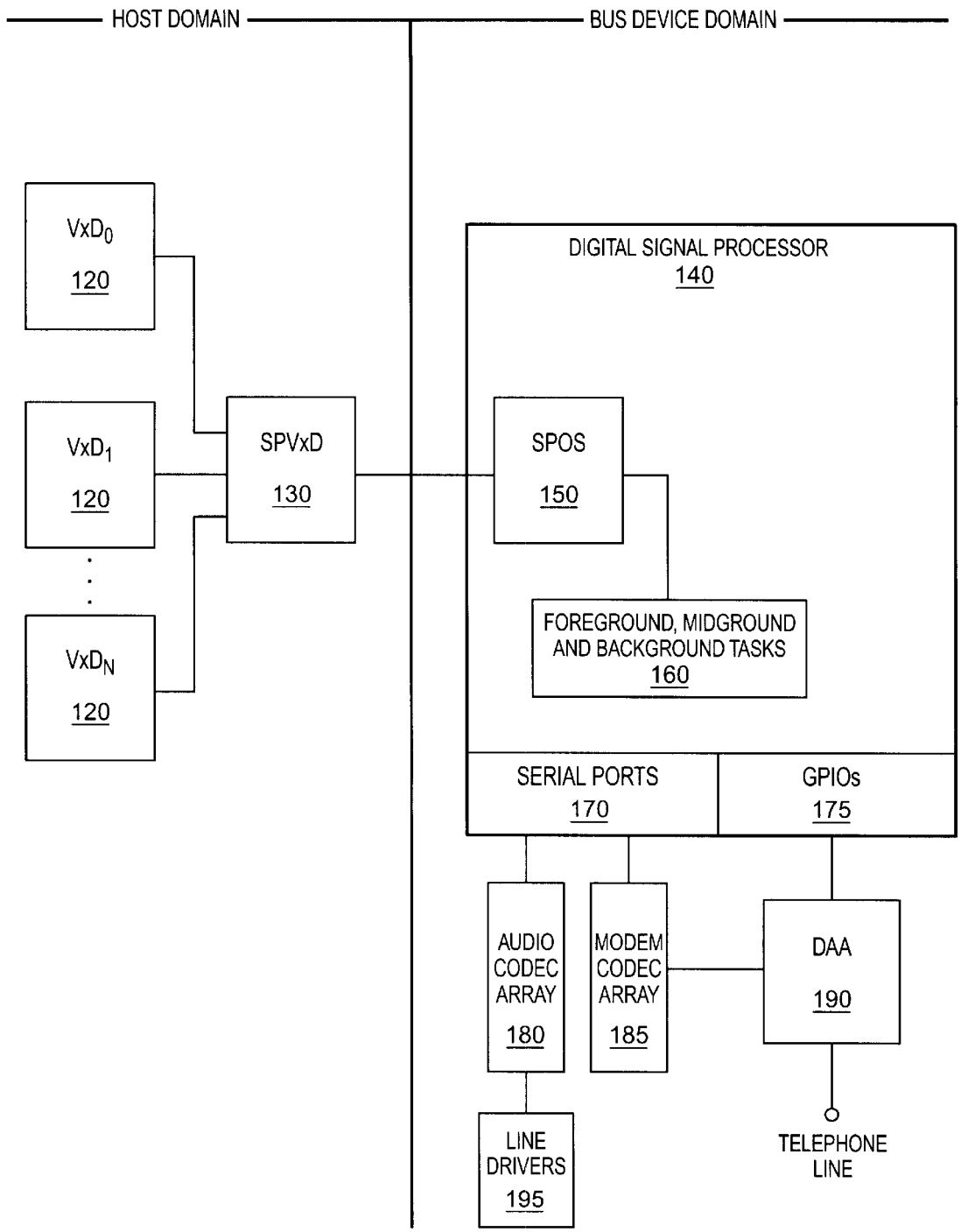
FIG. 1 is a block diagram showing an architecture suitable for integrating audio and modem functionality in accordance with one aspect of the invention.

FIG. 1 is a block diagram showing an architecture suitable for integrating audio and modem functionality in accordance with one aspect of the invention. This diagram is symbolic in that it shows a separate host domain 100 separated from a bus device domain 110 by a bus, such as PCI bus 105. A plurality of devices on the bus can be managed by the host. Typically, each of those devices will have a device driver 120 which serves as the interface to that device. The interface of each of the virtual device drivers 120 to the PCI bus 105 is through a stream processing virtual device driver 130 which can manage the plurality of streams originating and terminating in virtual device drivers 120. A number of devices may be connected to the PCI bus 105. One such device, namely device 140, is shown in FIG. 1. Device 140 is a digital signal processor capable of handling multiple digital streams. Preferably, the multiple stream digital signal processor is a DSP identified as CS4610 available from Cirrus Logic.

The digital signal processor has a stream processing operating system 150 which manages a variety of tasks which can be run either in foreground, midground or background (160). The digital signal processor manages a plurality of serial ports 170 and a plurality of general purpose input/output ports 175. Connected to the serial ports 170 is an audio codec array 180. The audio codec array performs analog to digital conversion and digital to analog conversion of analog signals from line drivers 195 and from digital data arriving over a serial port 170, respectively. Many of the audio sources feeding audio codec array 180 are high quality audio sources requiring an elevated sampling rate to maintain the fidelity during the digital signal processing. A plurality of codecs 185 form a modem codec array. Modem signals on a modem line are sampled, converted to digital and applied to the digital signal processor over the serial ports 170. Digital information from the digital signal processor can pass over serial port 170 to the modem codec array which converts the digital into analog and applies the analog output to the modem line. A telephone line connects to a data access arrangement (DAA). The DAA serves as a line interface between a telephone line and the DSP 140. The signalling portion of telephone signals is handled in the DAA and control lines between the DAA and the general purpose input/outputs 175 are used to passing ringing information to the DSP and receive control signals from the DSP. The non-signaling portion of the information is applied to the modem codec array as another modem input signal, where it is sampled and applied to the serial ports 170 like any other modem signal.

Figure 2:
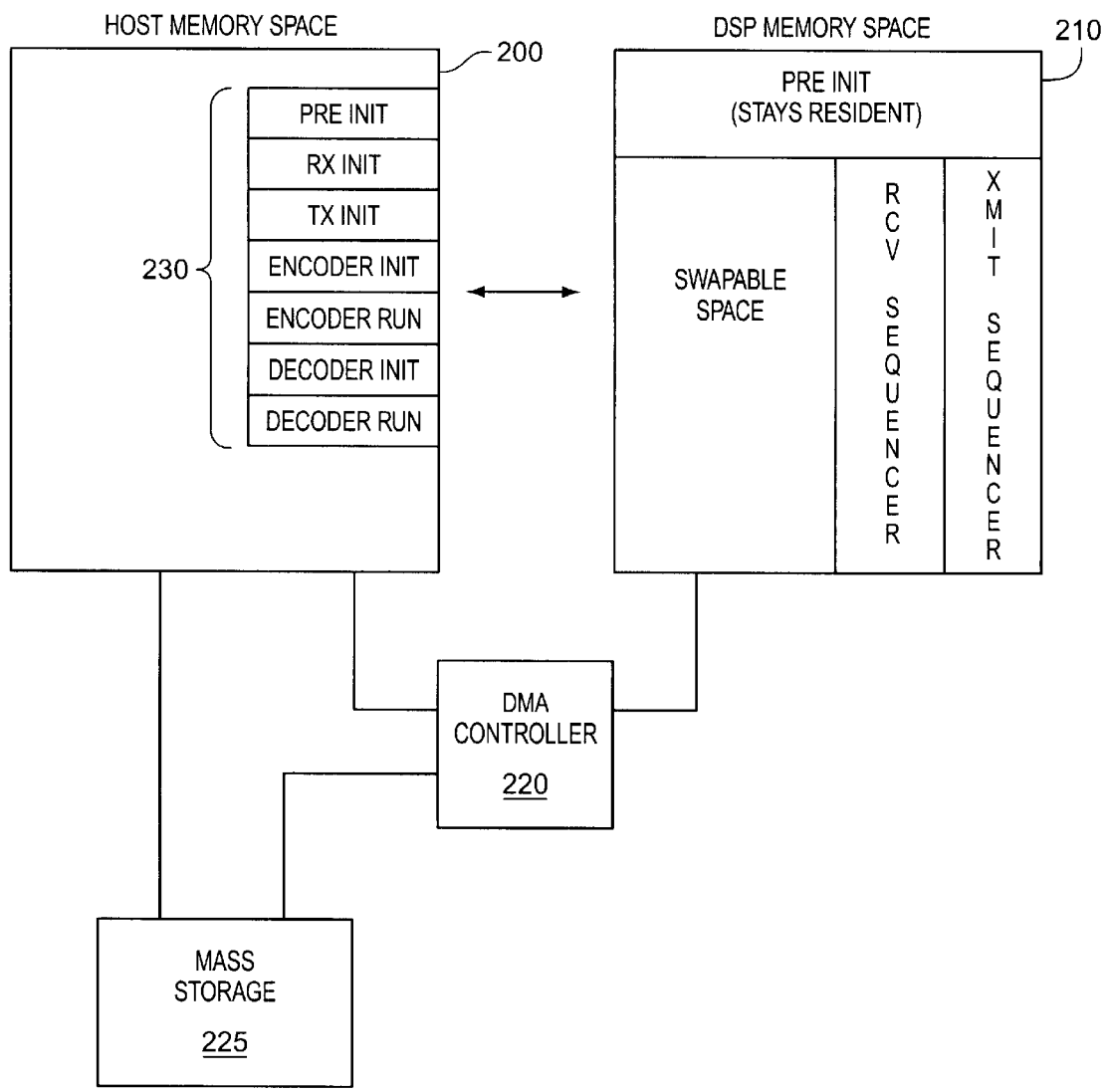
FIG. 2 is a block diagram illustrating swapping of code between a host and a DSP in accordance with one aspect of the invention.

FIG. 2 is a block diagram illustrating swapping of code between a host and a DSP in accordance with one aspect of the invention. A host memory space 200 is shown and a corresponding memory space 210 for the DSP is also shown. A DMA controller 220 can manage a transfer of information from the host memory space 200 to and from the DSP memory space 210 without host intervention. The DMA controller can also be arranged to transfer information from mass storage 225 into the host memory space and back. In some digital signal processors, where memory space is limited overall or in which memory space is limited for use by a particular application, it may be desirable to load and execute only the modules of code that are necessary for a particular state of the modem. A plurality of such modules 230 is stored in host memory space 200. As discussed more hereinafter, when the DSP is initialized with a modem application, a pre-init module is loaded into the DSP and stays resident until the modem application completes. The pre-init is accompanied by a transmit sequencer and a receive sequencer which also stay resident. Associated with each modem application is a swappable space in the DSP which can be utilized to bring in and execute one or more of the modules 230 as may be required for modem execution. Once a particular module finishes executing, it can be overwritten by a DMA transfer of another module to be executed in the DSP. FIG. 2 illustrates only the transfer of code modules for a modem application in and out of the DSP memory space. This figure does not illustrate signal processing, but only the use of code swapping to implement the modem applications in the DSP. Signal processing is discussed more hereinafter.

Figure 3:
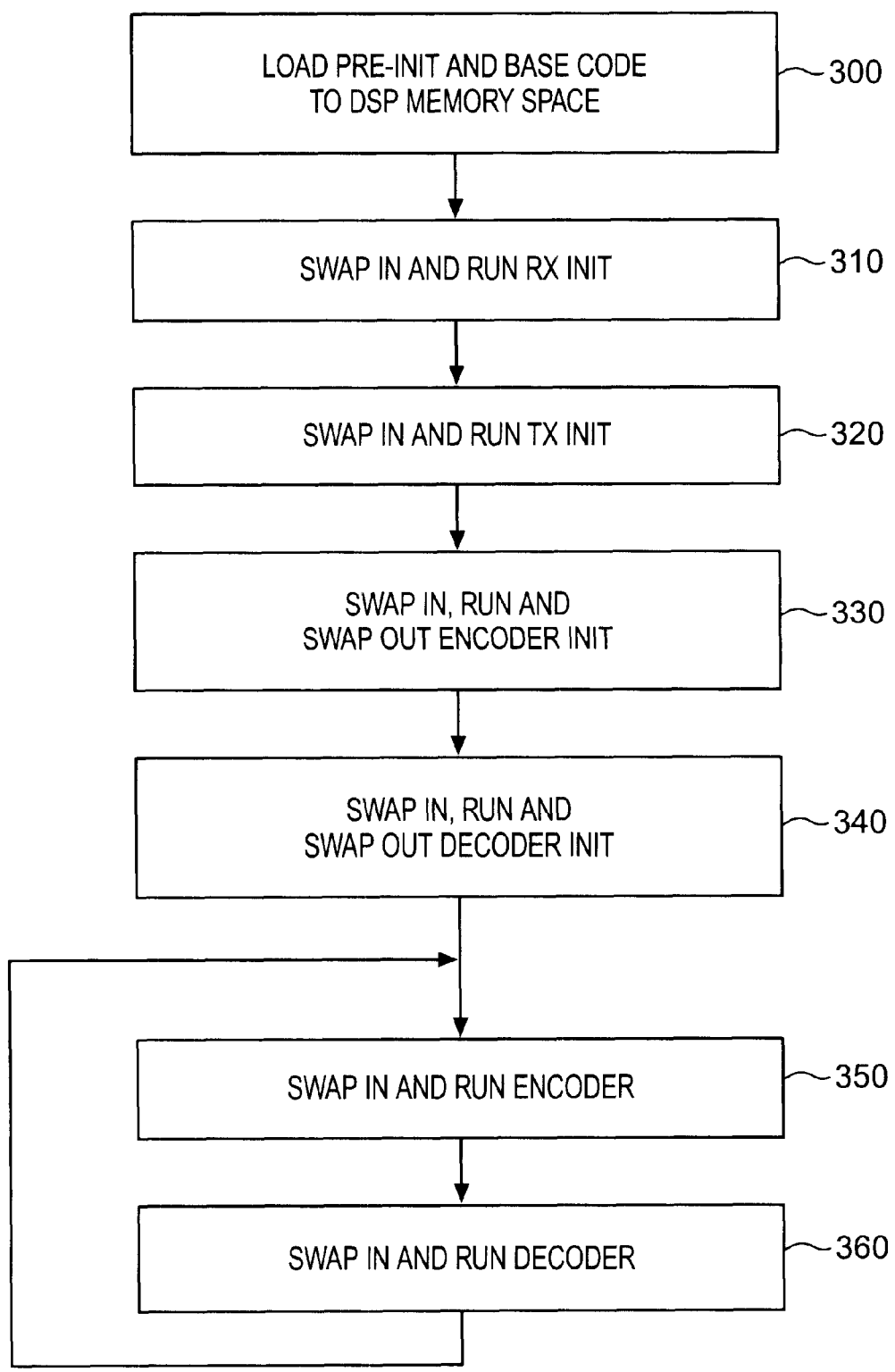
FIG. 3 is a flow chart of a process for swapping code in and out of a DSP in accordance with one aspect of the invention.

FIG. 3 is a flow chart of a process for swapping code in and out of a DSP in accordance with one aspect of the invention. When a modem application is required, the base code including a pre-initialization sequence is loaded to the DSP memory space (300). The Rxinit and Txinit modules are swapped in from the host memory space into the DSP memory space and are executed (310, 320) The Rxinit and Txinit process established the transmit and receive sequencers in the DSP memory space and prepares them for handling modem functions. The encoder-init and decoder-init modules (330, 340) are swapped in, run and swapped out. These set up the initial operating conditions for the various functional blocks of the modem, discussed more hereinafter. Once the initialization phase is completed (after 340), encoder run and decoder run processes execute sequentially and continuously to process the signal samples going to and from the codecs.

The encoder run and decoder run modules are each designed to do batch processing on a group of symbols. Typically, the symbols will be processed in eight symbol batches. This reduces the processing requirements considerably over signal sample oriented processing. A plurality of signal samples is normally required in order to identify each symbol.

Functional Description

Figure 4:
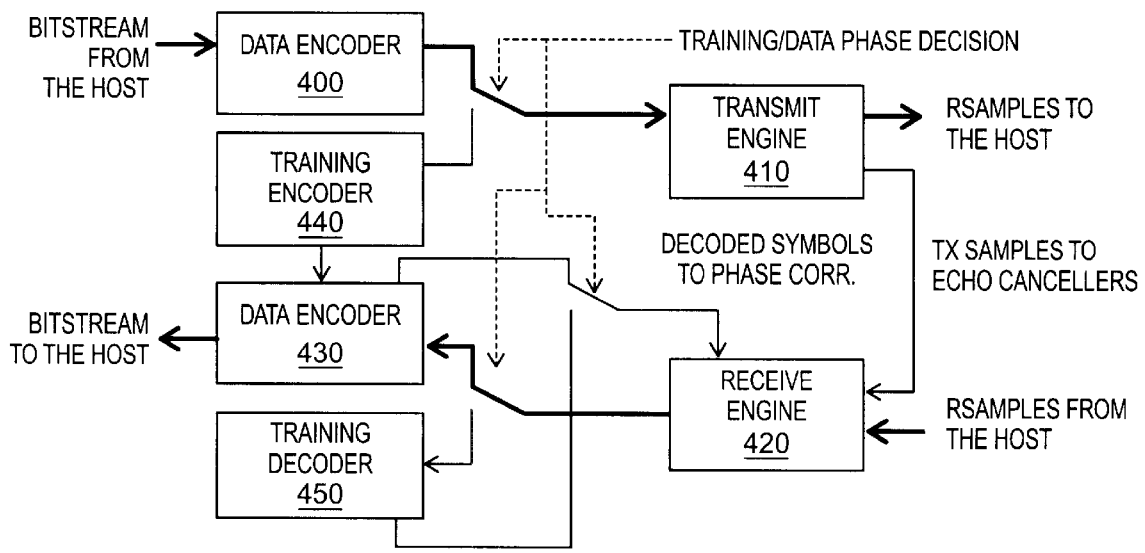
FIG. 4 is a high level block diagram of an exemplary modem carrying out aspects of the invention.

FIG. 4 is a high level block diagram of an exemplary modem carrying out aspects of the invention.

The modem operates in two modes, a training phase and a data phase. During the data phase, bitstream data from the host is encoded into symbols by the data encoder (400). The symbols are then modulated and filtered into samples by the transmit engine (410). These samples are transferred back to the host (to be transmitted on the line). The host manages the sample rate conversion and the code. On the receive side, samples from the host (received from the line) are demodulated and filtered into symbols by the receive engine (420). The receive engine uses symbols from the transmit engine to perform the echo-cancellation and uses symbols from the decoder to do channel equalization and samples from the receive base band filter to do listener echo cancellation. The symbols are decoded by the data decoder (430) into bitstream data which is transferred back to the host.

During a training phase, the modem sequencer triggers the training encoder (440) to generate the appropriate training sequences. The symbols generated by the training encoder go through the same transmit engine as in the data phase. Similarly, the training decoder (450) is fed symbols by the receive engine. The sequencer also controls various parameter settings in the transmit and receive engine, like step sizes, etc. which are different in the training and data phases. Initially, the sequencer connects the transmit/receive engines to the training encoder/decoder. After training is complete, the engines are switched to the data encoder/decoder. The sequencer re-enters the training phase, if requested by the host controller.

Data Encoder

Figure 5:
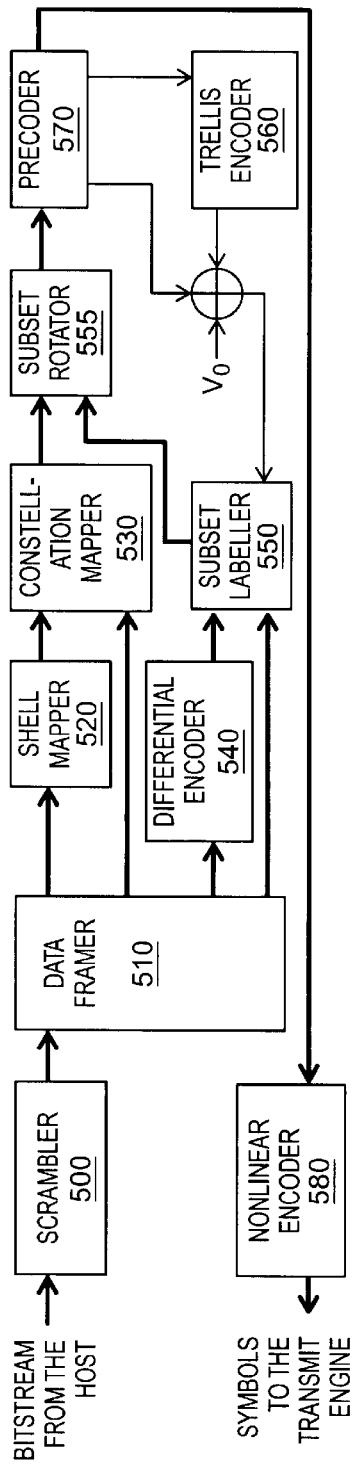
FIG. 5 is a block diagram of an exemplary data encoder illustrated in FIG. 4.

FIG. 5 is a block diagram of an exemplary data encoder illustrated in FIG. 4. Bitstream data from the host is scrambled (500) to randomize it. The data framer (510) distributes the incoming bits 1 into separate streams to the shell mapper (520), the constellation mapper (530), the differential encoder (540) and the subset labeler (550). The shell mapper maps the input bits into 8 ring indices. These indices are used to pick the rings in the constellation used by the next 8 symbols. The constellation mapper uses the ring index and bits from the data framer to pick the appropriate point in the constellation. This point is then rotated by 0, 90, 180 or 270 degrees (555), depending on the input from the subset labeler. The subset labeler uses information from the differential encoder and the trellis encoder (560) to pick the desired rotation angle. The symbol is pre-coded (570) to aid the remote equalizer and subjected to a non-linear transfer function (to combat non-linear distortion on the channel). The symbol is used by the transmit engine to generate the samples to be transmitted.

Training Encoder

Figure 6:
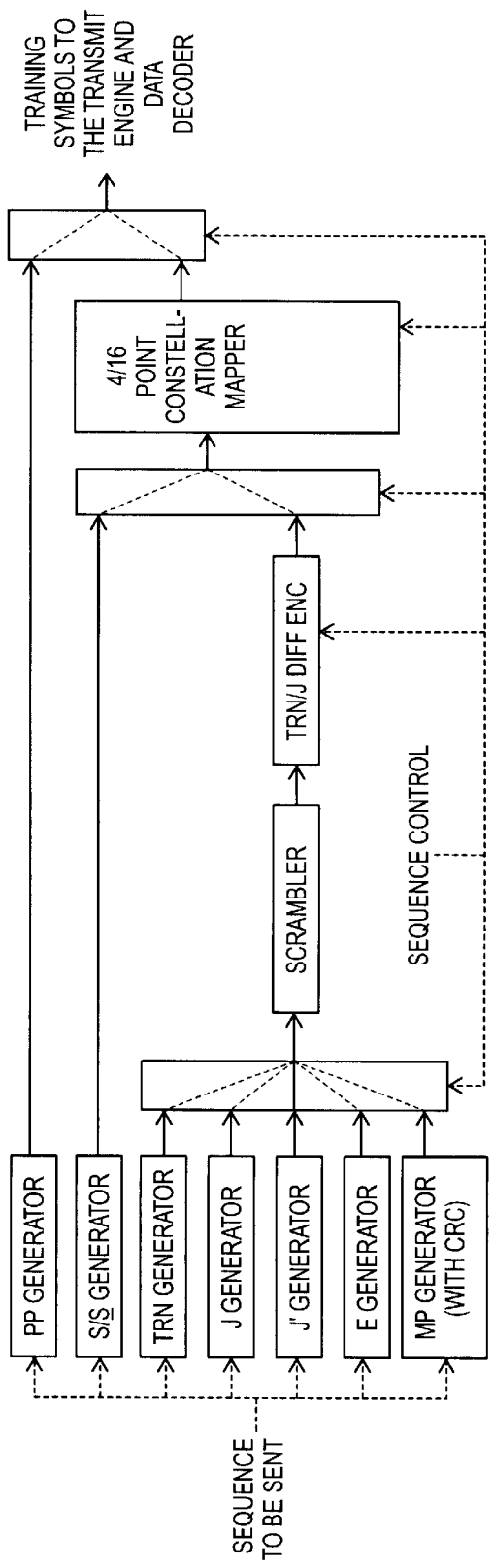
FIG. 6 is a block diagram of an exemplary training encoder illustrated in FIG. 4.

FIG. 6 is a block diagram of an exemplary training encoder illustrated in FIG. 4. The training encoder encodes the various training sequences sent by the modem in phase 3 and phase 4. The timing and order of generation of the training sequences is controlled by the overall modem sequencer. A brief description of the various sequences generated is as follows.

PP sequence: This is a constant amplitude zero autocorrelation sequence sent for fast training of the equalizer. It consists of six periods of 48 symbols and is sent in training phase 3.

S/S sequence: This consists of two alternating points in the four point constellation and a phase reversed version. It is used as a marker in both phase 3 and 4.

TRN sequence: This consists of a sequence of ones. It is used for training in both phase 3 and 4.

J sequence: This is a 16 bit pattern which specifies whether phase 4 training will use a 4 point constellation or a 16 point constellation.

J' sequence: This is a 16 bit pattern and is used to indicate the beginning of phase 4.

E sequence: This is a 20 bit sequence of ones. It is used to indicate the end of phase 4.

MP sequence: This sequence is an 88/188 bit pattern with a 16 bit header and 15 bit CRC. It is used by the modems to exchange data phase parameters like bit rate, precoder coefficients, etc. All sequences, except PP and S/S are scrambled and differentially encoded before being mapped to symbols. The sequence B1 which is sent just before data phase is part of the data phase initialization.

Transmit Engine

Figure 7:
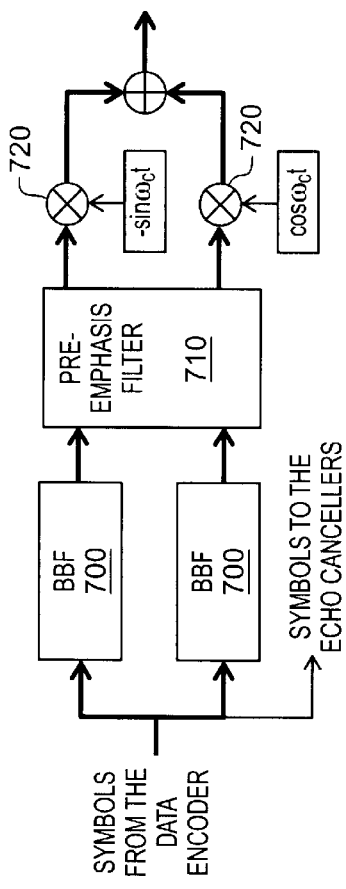
FIG. 7 is a block diagram of an exemplary transmit engine illustrated in FIG. 4.

FIG. 7 is a block diagram of an exemplary transmit engine illustrated in FIG. 4. Symbols from the data encoder are up-sampled to 3× the symbol rate. The base-band filter (BBF 700) also serves as the up-sampling anti-aliasing filter. The BBF is a 48-tap, real FIR filter. The filtered samples are then passed through a pre-emphasis filter (710) which does the pass-band spectral shaping specified by the remote modem in the training phase. There are 11 sets of 6-tap complex FIR filters, one for each of the specified spectral shapes. The samples are then modulated by the carrier (720) before being transferred by the host for final up-sampling and transmission.

Receive engine

Figure 8:
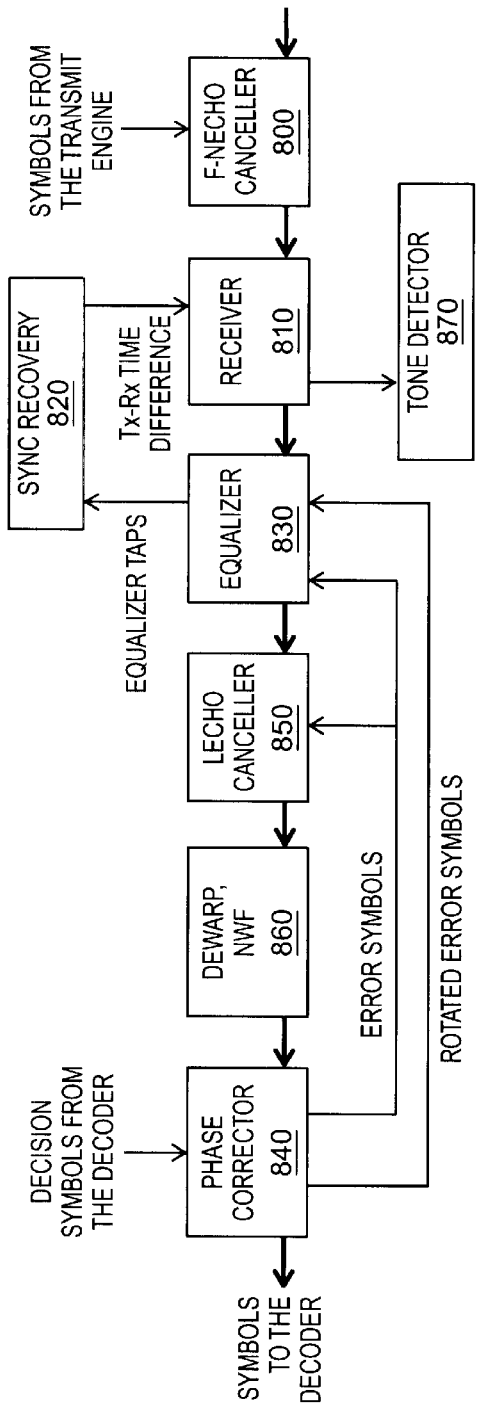
FIG. 8 is a block diagram of an exemplary receive engine illustrated in FIG. 4.

FIG. 8 is a block diagram of an exemplary receive engine illustrated in FIG. 4. Input samples from the host (received on the channel) are first passed through the F-Necho canceller (800). The cancellers remove the near and far end echo of the transmitted signal from the received signal. The signal is then de-modulated and filtered by the receiver (810). The receiver uses the Tx-Rx time difference computed by the sync recovery section (820) to match the receive sample time to the transmit sample time of the remote modem. The distortion introduced by the channel is removed by the equalizer (830). The equalizer uses error symbols from the phase corrector (840) for tap-update and the rotated error symbols for gain tracking.

The listener echo, which is the echo of the received signal itself is removed (850) before the signal is passed through the non-linear decoder and noise-whitening filter (860). The phase corrector tracks the phase jitter and the frequency offset of the carrier and corrects for phase errors introduced. The corrected symbols are then sent to the data decoder or the training decoder for final decoding to bitstream. During data phase, a tone detector (870)is used to detect requests from the remote modem for rate negotiation or retrain.

F-Necho Canceller

Figure 9:
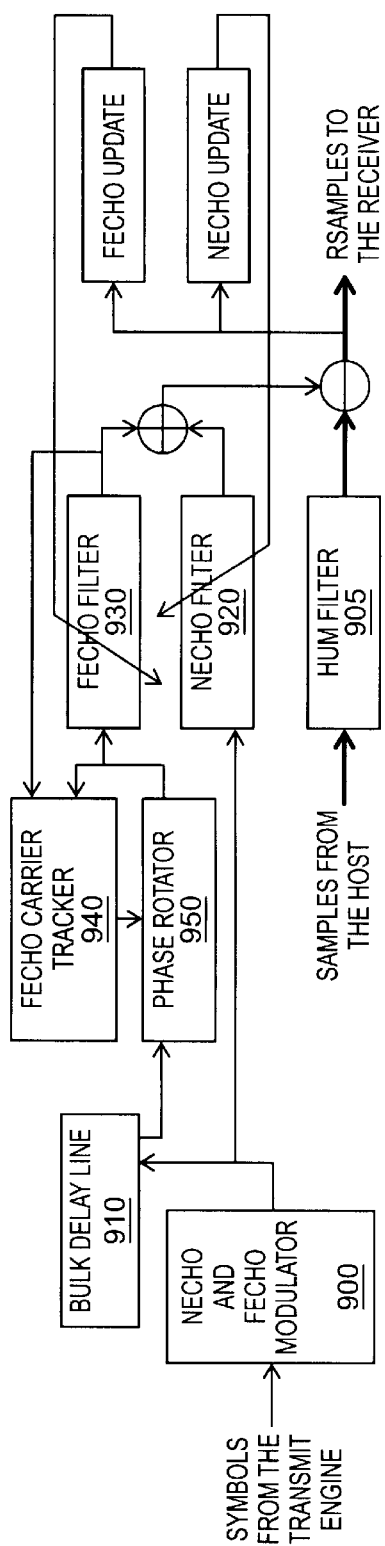
FIG. 9 is a block diagram of a far-near (F-N) echo canceller shown in FIG. 8.

FIG. 9 is a block diagram of a far-near (F-N) echo canceller shown in FIG. 8. The echo cancellers remove near-end and far-end echos of the transmitted signal from the received signal. The received samples from the host are passed through a hum filter (905)which removes DC and power-line hum. The near-end and far-end echo is then subtracted from the signal. This subtraction is performed on double precision samples. The samples are then sent to the receiver for de-modulation and filtering. The echo is generated using symbols from the transmit engine.

Symbols from the transmit engine are pre-modulated (900) to the pass-band and fed to the bulk delay line (910) and the Necho filter (920). The bulk delay line matches the delay experienced by the far end echo on the channel. The Necho is generated by passing the symbols through the 2 120-tap real adaptive FIR filters operating on the real and complex parts of the symbol respectively. Since the received samples are at 3× symbol rate, 40 taps of the canceller are used and updated at each sample. The Fecho is generated in a similar fashion using another set of 120 tap real adaptive FIR filters (930).

A Fecho carrier tracker (940) is used to correct for phase shifts experienced by the Fecho due to FDM (if any) on the line. The carrier tracker measures the phase difference between the input and output of the Fecho filter and uses it to generate a phase correction (950)(in a PLL-type configuration).

Receiver

Figure 10:
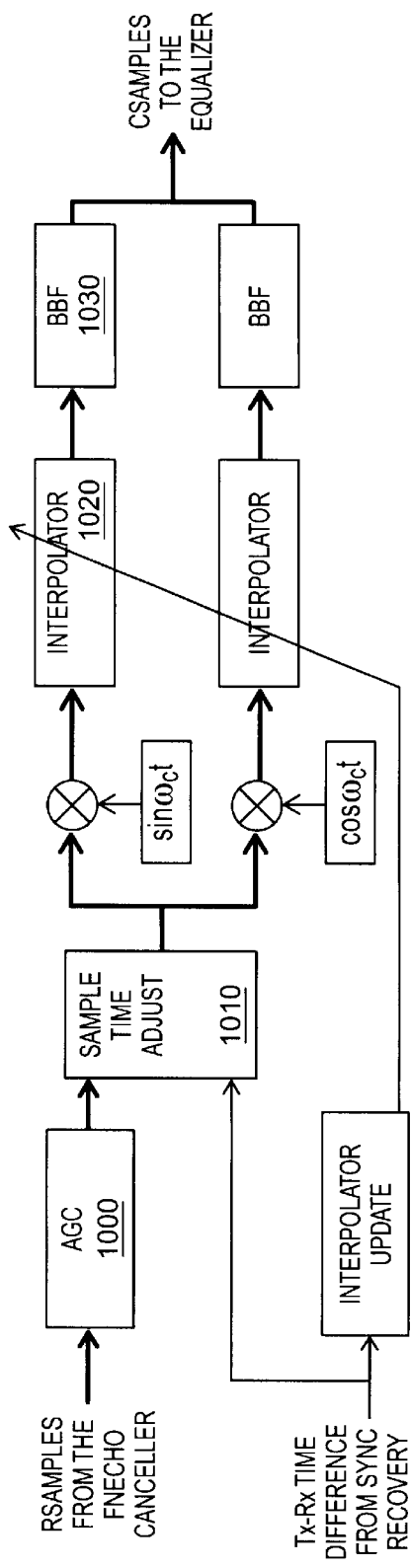
FIG. 10 is a block diagram of a receiver shown in FIG. 8.

FIG. 10 is a block diagram of a receiver shown in FIG. 8. The receiver de-modulates the received samples to the base-band (still at 3× symbol rate). The AGC (1000) produces a near constant signal power by tracking the gain of the channel. The gain is tracked by comparing the received signal power to a fixed reference. The sampling rate of the received signal is locked to the local transmit clock and needs to be matched to the remote transmit clock. The sample time adjust (1010) feeds two or four samples to the demodulator depending on whether the remote clock leads or lags the local transmit clock. The signal is then demodulated into the base band. The interpolator (1020) is a 3-tap FIR filter. The filter taps are set depending on the estimated difference between the Tx and Rx clocks. The interpolated signal is band limited by the base band filter (1030). The receive base-band filter is a 48-tap FIR filter, identical to the transmit filter.

Equalizer

Figure 11:
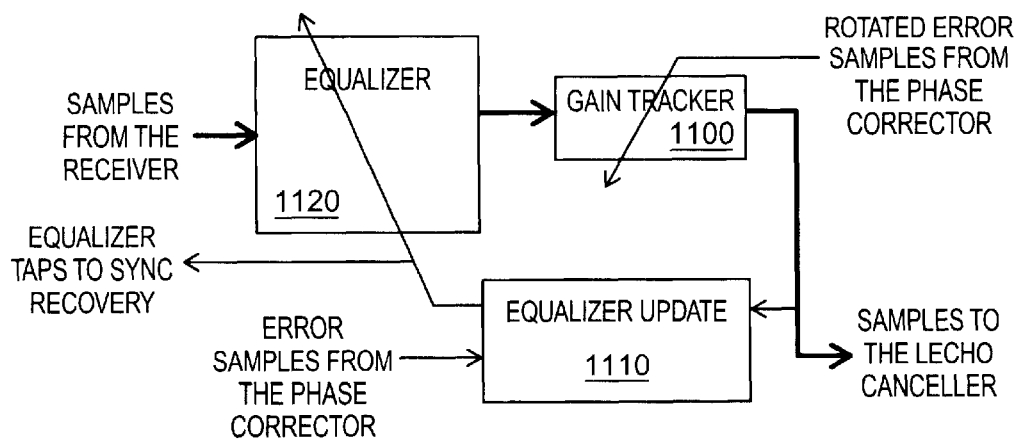
FIG. 11 is a block diagram of an equalizer having a fast gain tracker shown in FIG. 8.

FIG. 11 is a block diagram of an equalizer, having a fast gain tracker, shown in FIG. 8. The distortion due to the channel is removed by the equalizer. The equalizer (1120) is a 60 tap complex adaptive FIR filter. The taps are updated (1110) twice every three samples using the error symbols from the phase corrector. The equalizer taps are used by the sync recovery section to estimate the Tx-Rx sample rate difference. The gain tracker (1100) is used to track sudden changes in the gain of the channel. The rotated error symbols from the phase corrector and the current gain is used to update the new gain value.

Lecho Canceller

Figure 12:
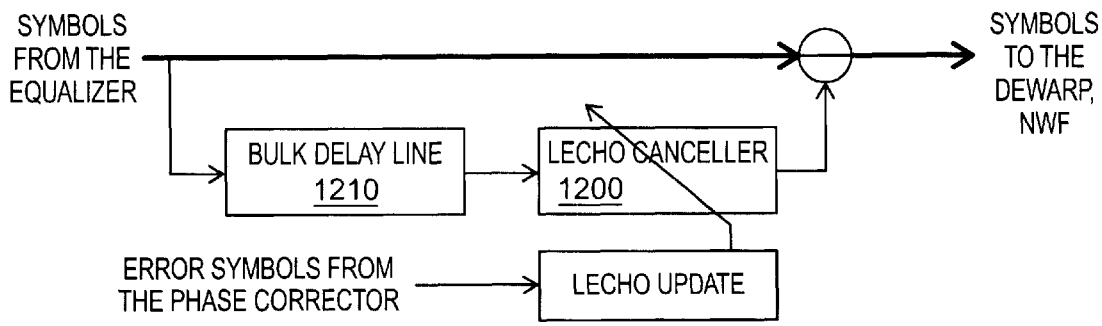
FIG. 12 is a block diagram of a listener (L-echo) echo canceller shown in FIG. 8.

FIG. 12 is a block diagram of a listener (L-echo) echo canceller shown in FIG. 8. The Lecho canceller removes the echo of the received signal from the received signal. A 16-tap complex adaptive FIR filter is used to cancel the listener echo (1200). The bulk delay line (1210) matches the delay experienced by the signal on the channel. The Lecho canceller taps are updated using the error signal from the phase corrector.

Sync Recovery

Figure 15:
FIG. 15 is a block diagram of a sync recovery circuit shown in FIG. 8.

FIG. 15 is a block diagram of a sync recovery circuit shown in FIG. 8. The sync recovery section estimates the frequency difference between the local and remote sample clocks. This delay will appear as a constant frequency offset introduced by the channel and reflected in the equalizer taps. To compute this constant shift, a DFT (1500) is done on the equalizer taps to generate the B/4 and −B/4 spectral components, where B is the baud rate. The phase difference between the components is the sync error, which is filtered through a second order PLL (1510) to get the time difference between the clocks.

Tone Detector

Figure 16:
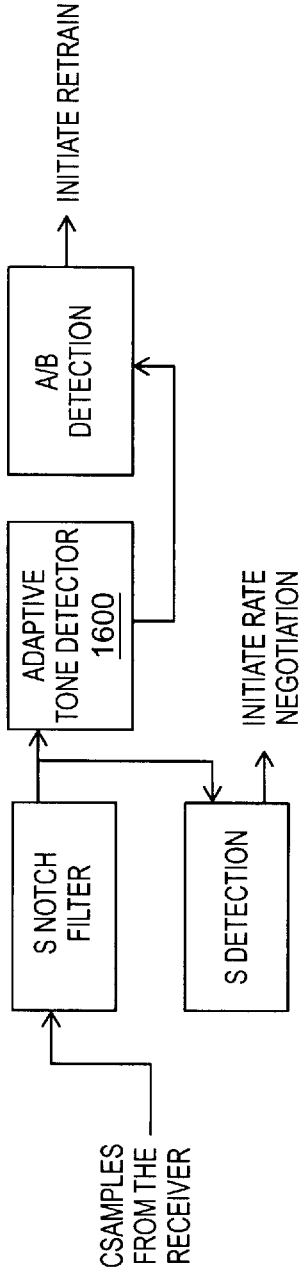
FIG. 16 is a block diagram of a tone detector shown in FIG. 8.

FIG. 16 is a block diagram of a tone detector shown in FIG. 8. The remote modem sends tone A (answer modem) or B (call modem) to initiate a retrain. The modem is supposed to go to training phase 2 on receipt of this tone. The tones are at the frequencies 2400 Hz and 1200 Hz respectively. Since the normalized frequency will be different for the various symbol rates, an adaptive tone detector (1600) is used to detect these tones. The detector is a complex adaptive FIR filter of the form $1-z^{-1}$. If a tone is being transmitted the tap will converge to the frequency of the tone. The amplitude of the tap is used to detect whether the tone is being transmitted.

The remote modem sends the sequence S to initiate a rate negotiation. The modem is supposed to go to training phase 3 on receipt of this sequence. The spectrum of the sequence S has peaks at the three complex roots of 1. It is detected by comparing the energy at the input and output of a notch filter which has zeros at these frequencies. The notch filter used is a simple FIR filter of the form $1-z^{-6}$.

Dewarp, NWF

Figure 13:
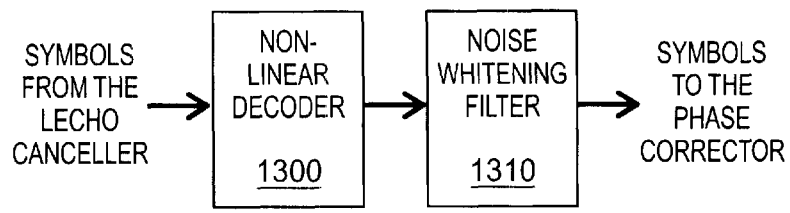
FIG. 13 is a block diagram of a debwarp and noise whitening filter shown in FIG. 8.

FIG. 13 is a block diagram of a dewarp and noise whitening filter shown in FIG. 8. The dewarping and noise whitening filters do the inverse operation of the non-linear encoder and filter at the remote transmitter. The non-linear decoder (1300) uses a polynomial of degree 4 as an approximation to the inverse of the non-linear encoding function specified in the standard. It also scales the signal to the slicing grid. The noise whitening filter (1310) is a 3 tap complex FIR filter, whose co-efficients are sent to the remote modem during the training phase. The co-efficients are trained using a complex version of the Levinson-Durbin algorithm. An example of this is shown in co-pending U.S. application Ser. No. 08/775,769 referenced above.

Phase Corrector

Figure 14:
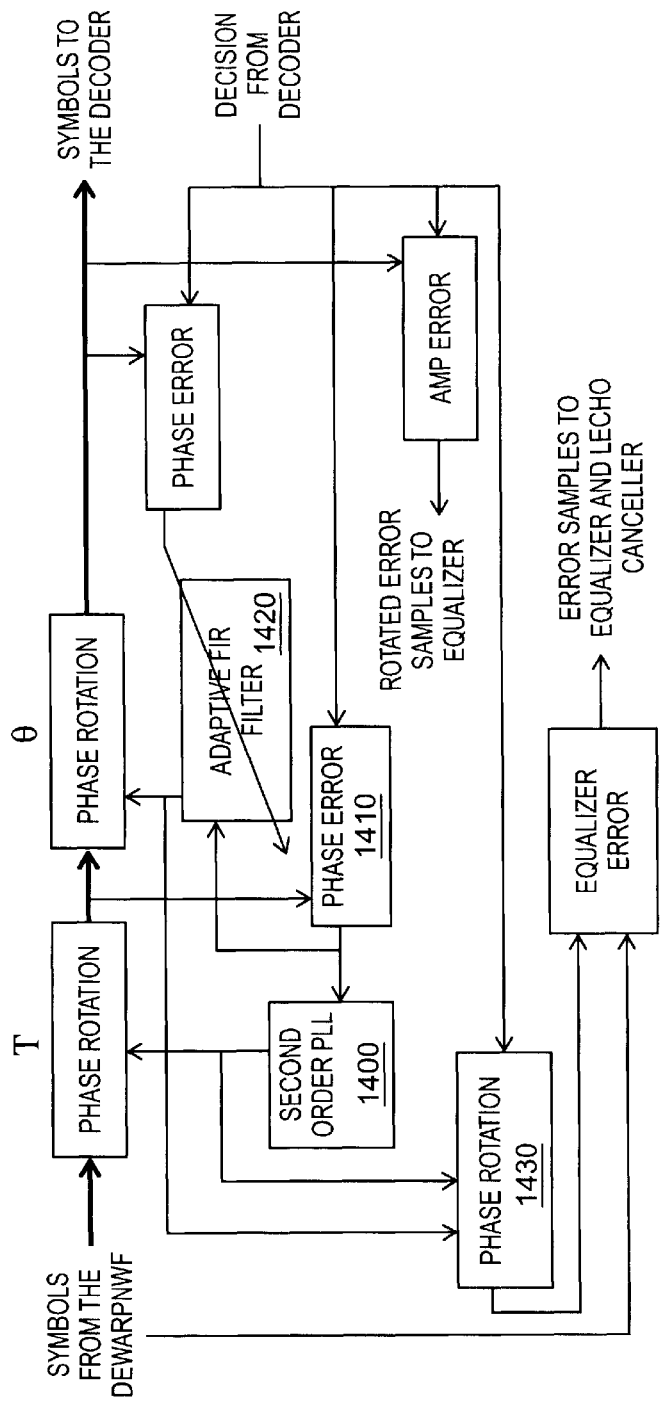
FIG. 14 is a block diagram of a phase corrector shown in FIG. 8.

FIG. 14 is a block diagram of a phase corrector shown in FIG. 8. The phase corrector corrects for the frequency offset in the carrier and the carrier phase jitter. The carrier frequency offset is tracked by a second order PLL (1400), which uses the phase error (1410) between the symbols from the decoder and the input symbols. The phase jitter is tracked by a 60 tap real adaptive FIR filter (1420). Since the jitter is not very large, $\frac{1}{3}^{rd}$ of the filter taps are updated each symbol.

The amplitude error between the output of the phase corrector and the decision symbols from the decoder is sent to the gain tracker in the equalizer. The decision symbol from the decoder is then rotated (1420) by the same amount as the input symbol, but in the reverse direction. The error between the rotated decision symbols and the input symbols is used to update the equalizer taps.

Data decoder

Figure 17:
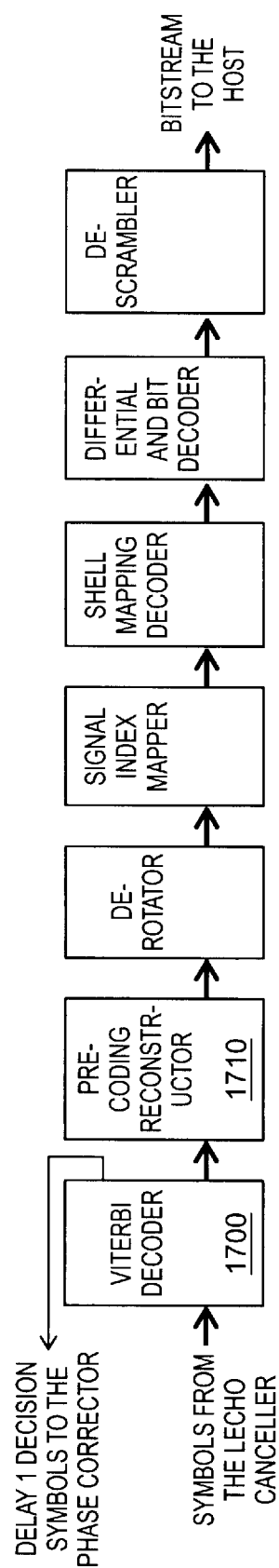
FIG. 17 is a block diagram of a data decoder illustrated in FIG. 4.

FIG. 17 is a block diagram of a data decoder illustrated in FIG. 4. The data decoder section converts the symbols into bitstream data. It performs the inverse of the operations done by the data encoder. The Viterbi decoder (1700) only supports the 16 state convolution code at the remote encoder. The Viterbi decoder picks the path through the trellis with the maximum likelihood. The final decision is generated after a delay of 16 4D symbols, i.e. 32 symbols. A zero-delay 4D decision, i.e. a delay of 1 symbol is used for the equalizer tap update. After preceding reconstruction (1710), the ring indices, the uncoded bits and the differentially encoded bits are extracted and packed appropriately before transferring them to the host.

Training Decoder

Figure 18:
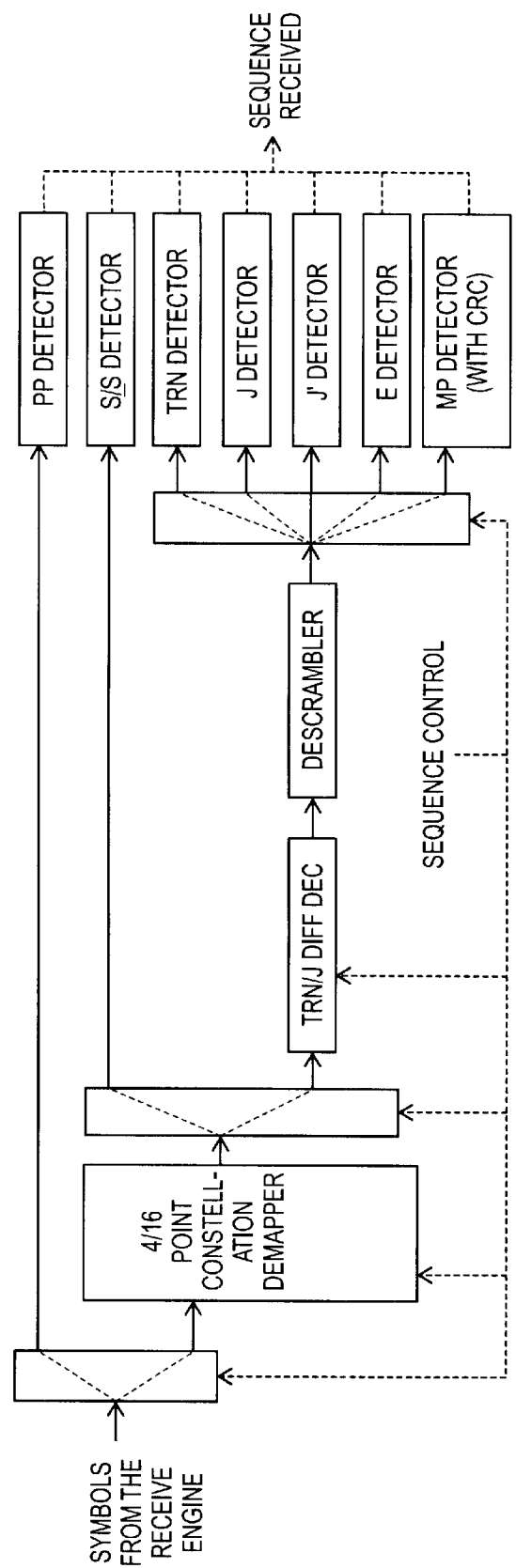
FIG. 18 is a block diagram of a training decoder shown in FIG. 4.

FIG. 18 is a block diagram of a training decoder shown in FIG. 4. The training decoder decodes the received symbols into received sequences. These sequences are then compared against the desired received sequences in order to trigger error procedures.

Figure 19:
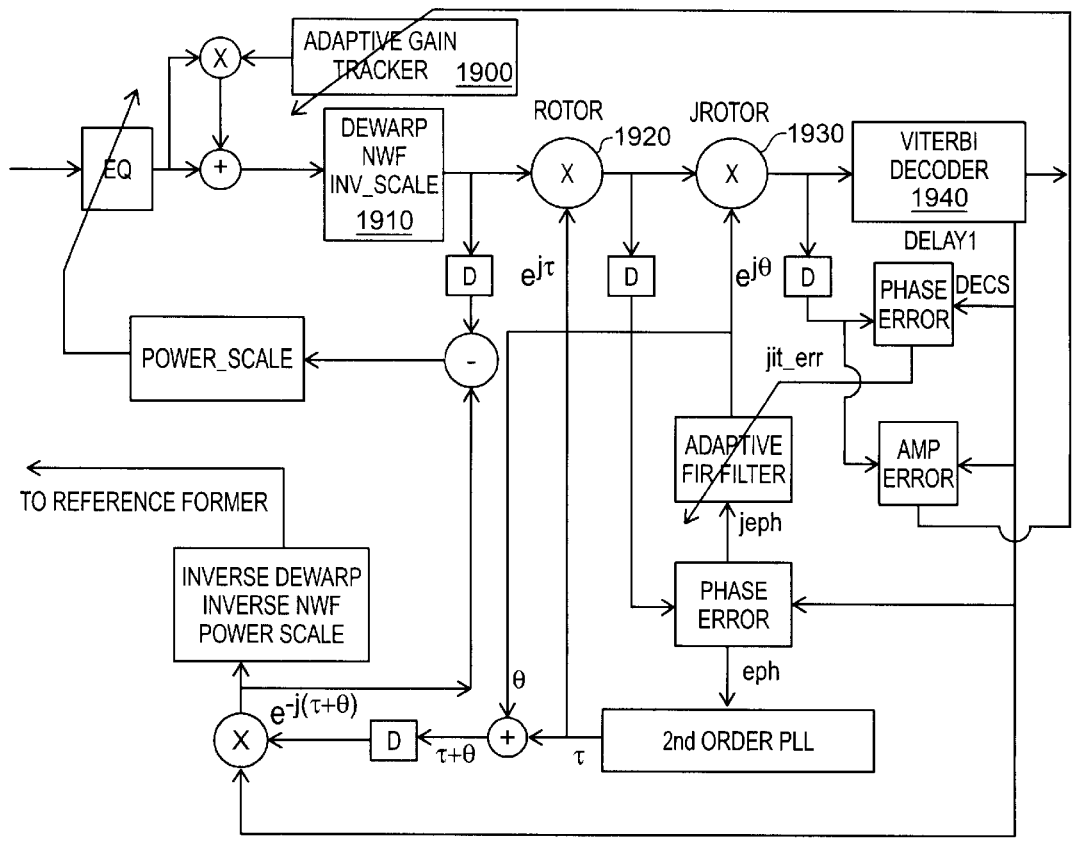
FIG. 19 is a block diagram of an alternative phase corrector to that shown in FIG. 14.

FIG. 19 is a block diagram of an alternative phase corrector to that shown in FIG. 14 that will be used in the following discussion.

V.34 Phase & Amplitude Correction

1. Introduction:

As an example, this section will discuss the implementation of carrier tracker, phase jitter tracker, and amplitude jitter tracker for V.34. Although the names of the submodules are similar to their V.32bis counterparts, due to a very large constellation and high performance requirement for V.34, the actual implementation has to be modified and improved significantly, as discussed herein.

At the equalizer output, there is an adaptive gain tracker (1900) to bring signal towards slicing grid. This is especially useful for V.34 since there are many possible signal constellations and preceding may also change the signal power. As a result, the received data signal power may not be exactly equal to the power in training. Regular AGC is not fast enough to adjust. After the gain adjustment, the signal passes through dewarper(1910—nonlinear decoder) and noise whitening filter, and is scaled to 80H grid. ROTOR (1920) rotates the signal to remove carrier frequency offset. JTOTOR (1930) rotates the signal again to remove phase jitter. Then the signal is sent to Viterbi decoder (1940). The Viterbi decoder in V.34 is 4D-based, and the final decision is delayed by 16 4D intervals (32 bauds). If we compute the error signals based on the final decision, the errors will have a long delay, and we have to use the delayed least mean square LMS algorithm to update all the adaptation loops. This is possible, but not convenient. A different approach is used here. In addition to the regular Viterbi decoder decision, we compute an early decision—a delay 0 decision. Namely, in the Viterbi decoder, before we trace back, we make a decision for the current 4D, i.e., at the end of each 4D, we have the early decision for the two 2D symbols in this 4D. Since the decision for the first 2D in the 4D is not available until the second 2D, we have one-baud decision delay (delay 1 decision in the figure). Therefore, we still have to use DLMS, but its delay is only one baud. In the figure, each "D" block means one baud delay, and they are necessary in the DLMS algorithm.

Next, each function unit will be discussed in detail.

Figure 20:
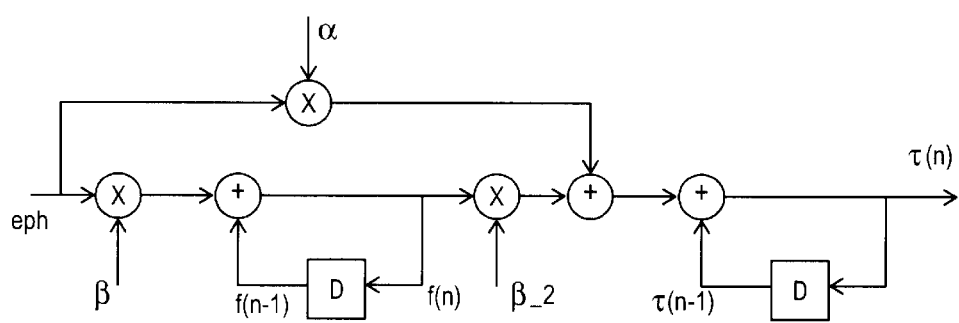
FIG. 20 is a diagram used to illustrate the operation of carrier tracking as it occurs in FIG. 19.

2. Carrier Tracker (FIG. 20):

Note that the constant $\beta\_2$ should be inversely proportional to the baud rate. It is initialized in the beginning of phase 3. In the V.34 implementation, both f and $\tau$ have double precision to improve the accuracy. In V.32bis code, only f uses double precision.

A new algorithm for computing the phase difference between two complex vectors is implemented for V.34. This algorithm is different from the one used in V.32bis, where the phase difference $\alpha$ between two complex vector S and D is computed as follows.

$$\alpha \approx \sin \alpha$$
$$\approx (S_r *D_i - S_i *D_r)/|D| \, |S|$$
$$\approx (S_r *D_i - S_i *D_r)/|D|^2$$

where $\alpha$ is the angle between D and S. A look-up table for $1/|D|$ is prestored in memory to facilitate the computation. This is feasible in V.32bis since the signal constellation is limited. As a result, such a table is quite small. This is no longer feasible for V.34. V.34 has a signal constellation up to 1664. Furthermore, the preceding may expand the constellation even further. Even though we store only a quarter of it, we still need a large memory space, and its dynamic range is big.

A new algorithm is as follows.

$$x = \tan \alpha = (S_r *D_i - S_i *D_r)/(S_r *D_r + S_i *D_i)$$

$$\alpha = \arc \tan (x) \approx 0.999960426x - 0.331837378x3 + 0.184496733x5 - 0.079428803x**7$$

Note that here we have to make sure that $-1 \leq x' < 1$, i.e., $-45° \leq \alpha < 45°$. Hence, we can scale a such that 45° becomes 7ff. Note that this scale is 4 times bigger than the normal scaling where 7fff means 180°. This larger scale is very helpful in improving jitter tracker and carrier tracker precision. This new algorithm is more accurate than the one in V.32bis. The subroutine for this algorithm is called several times to compute the phase errors between different signals.

After we get the angle, we can call another subroutine to compute the sine and cosine values, which will be used in the rotation. This subroutine is also based on power series expansion, hence no prestored table is needed. Note that the scaling for the phase error is 4 times bigger, hence should be shift right by 2 bits before calling sin/cos routine.

3. Phase Jitter Tracker:

Phase jitter is compensated in JROTOR, which rotates the signal by an angle θ, which is the output of an adaptive FIR filter (phase jitter estimator), whose input is jeph, which is the phase error between the delayed ROTOR output and delay 1 decision. The phase error jeph is actually the same as eph. for the 2nd order PLL discussed above. The correction angle θ can be considered as the linear prediction of the phase error for the current baud signal based on the previous phase errors. Note that we compute the phase jitter estimator output θ before we shift in new phase error jeph.

To update the phase jitter estimator coefficients, we compute the phase error between the delayed JROTOR output and delay 1 decision. The phase error obtained is named jitt_err, and is used to update the tap coefficients.

Since phase jitters are usually very small, jout is typically very small. Also, jit_out is even smaller.

Here it is very important to fully utilize the available dynamic range. An effective technique is to scale down the filter output before storing to jout. In that way, the filter output should be bigger, so are the filter tap coefficients. Thus, for the same adaptation noise in jout, we can use a bigger step size so that underflow can be avoided. In the previous V.32bis implementation, the filter output is shift-left twice before storing to jout. This makes the situation even worse. In the new implementation, the filter output is shift-right twice, and the accuracy has been improved considerably.

In V.32bis code, the adaptive phase jitter estimator has 60 taps. Since the phase jitter frequency is no larger than 300 Hz, it is possible to reduce the number of taps by down sampling. In V.34 implementation, we down sample the input jeph by 3, thus reduce the number of taps to 20 for the same filter span. The input delay line is still the same (64 long) since we have to compute the output once every baud.

For the tap coefficient updates, since there is one baud decision delay, we have to use the DLMS algorithm. This is implemented by moving back the input buffer read pointer by 1 step in the adaptation.

4. Adaptive Gain Tracker:

In the figure above, there is an adaptive gain tracker to adaptively adjust the equalizer output gain when there is a sudden signal level hit. Besides the normal gain hit from the channel, it is very useful in the beginning of B1 of the V.34 standard. Normally, the AGC before equalizer normalizes the signal power. However, the signals are rescaled in nonlinear decoder and after noise whitening filter. Modems from different manufacturers may differ slightly in the scaling. Although equalizer coefficient update can bring signal after scaling to the slicing grid, such an adaptive gain tracker is much quicker to adjust. Note that B1 lasts only 35 or 40 ms, which is typically not long enough for normal equalizer adaptation.

The gain tracker (FIG. 11) is turned on in the beginning of B1. If the received signal power or the scale value in the receiver is slightly off, the signal point at the input to the Viterbi decoder will be off from the constellation grid. Since the phase errors are already compensated, the signal point and the decision point should ideally differ by the magnitude plus noise. We compute the approximate magnitude error as follows:

$$e(n)=[abs(D_r(n))-abs(S_r(n))]+[abs(D_i(n))-abs(S_i(n))]$$

where D(n) and S(n) are the decision point and the signal point, respectively, and the subscript r and i mean the real and imaginary part, respectively.

Note that when the gain is too small, e(n) should be positive while if the gain is too big, e(n) should be negative. We then use e(n) to update the gain g(n):

$$g(n)=(1-w)*g(n-1)+c*e(n)$$

where w is a leakage constant and c is the step size. g(n) is used to scale the equalizer output y(n):

$$y'(n)=y(n)(1+g(n))$$

g(n) is initialized to 0. If there is a sudden gain hit, g(n) will change quickly to its proper value so that mean square value of e(n) is minimized. A small leakage constant w is used to enhance the numerical stability. After the gain is stabilized, g(n) will slowly leak to zero or a small fixed value. The gain hit is transferred gradually to the equalizer coefficients.

If AGC is running at the same time, it will adjust the signal power slowly to the nominal value, and g(n) will track the signal power accordingly.

5. Amplitude Jitter Tracker:

The adaptive gain tracker can compensate gain hit properly. However, it is not designed for compensating the amplitude jitter. In V.32bis, there is an amplitude jitter canceller. It is not implemented for V.34 now. However, a design is provided below.

Firstly, the amplitude error is determined.

In order to update the adaptive phase jitter estimator, one computed the phase error between the delayed JROTOR output and delay 1 decision. Based on this phase angle, one can rotate the delayed JROTOR output signal exactly towards the delay 1 decision. After the rotation, the two signals have exactly the same phase, and they differ only by the magnitude. We can simply subtract one from the other to obtain the amplitude error vector.

Note that the amplitude error vector is a complex vector. We can compute its magnitude as the amplitude error. We can simply compute the sum of the absolute values of its real and imaginary parts as the amplitude error. If necessary, more accurate approximation of the magnitude can be obtained by:

$$|E|\approx max\ (E_r,E_i)+0.3.006min\ (E_r,E_i)$$

We also have to find out the sign of the amplitude error. Note that the amplitude error vector and the decisions vector are always on the same line, i.e. the angle between these two vectors is either 0 degrees or 180 degrees. If we compute the dot product of them, the result will be positive if the angle is 0 degrees and negative if the angle is 180 degrees. We then combine the amplitude error calculated above with this sign information to form the final amplitude error. Suppose one denotes the delayed JROTOR output signal by S, the delay 1 decision by D and the amplitude error vector by E we can write:

$$S'=Sd^{j(jit\_err)}$$

$$E=D-S''''$$

$$amp\_err=sign[E_r*D_r+E_i*D_i]*(|E_r|+|E_i|)$$

where the subscript r and I denote the real and imaginary part, respectively.

Note that this algorithm is completely different from the one used in V.32bis, where the amplitude error is computed as follows.

$$E = D - S$$

$$amperr = |D| - |S| \approx |D| - |S| \cos \alpha$$

$$= (|D|^2 - |D| \, |S| \cos \alpha)/|D|$$

$$= (D_r{}^*D_r + D_i{}^*D_i - S_r{}^*D_r - S_i{}^*D_i)/|D|$$

$$= (E_r{}^*D_r + E_i{}^*D_i)/|D|$$

where $\alpha$ is the angle between D and S.

Since the look-up table $1/|D|$ is no longer available in V.34 (it is too big to store), it is hard to use that formula. Note that there is an approximation $|D| - |S| \approx |D| - |S| \cos \alpha$ in that implementation. As a result, if there is. a phase jitter, and no amplitude jitter, such an approximation will show a false amplitude jitter. In the new algorithm, there is no such an approximation, and one does not need the table for $1/|D|$.

The simplified amplitude error calculation algorithm discussed in the adaptive gain tracker may also be used. It is much simpler, and quite effective.

In V32bis implementation, the error signal amperr then passes through a low-pass filter, whose output is used to scale the signal before ROTOR to compensate the amplitude jitter. The low-pass filter is as follows:

$$amp\_int = amp\_int + (0.5 - amp\_int)/128 + amperr * 3/16.$$

It is a one-pole IIR integrator with time constant about 128 bauds.

The performance of the amplitude jitter tracker has been tested. When the amplitude jitter canceller has to track a low-frequency sinusoid amplitude jitter, the performance is not good enough to compensate the amplitude jitter, because the low-pass filter can only filter out the low frequency jitter, but can not adjust the output phase to exactly match the low frequency jitter in signal. A better design is to add an adaptive amplitude jitter estimator similar to the phase jitter estimator. Namely, we can use the previous amplitude errors to estimate the amplitude error for the current baud. Such a structure is shown in the figure below. Note the amplitude jitter is compensated at the output of equalizer so that we don't need an inverse for the equalizer error calculation. This makes the implementation more efficient. Such an adaptive amplitude jitter canceller needs some memory space and cycles, and may not be desired.

Figure 21:
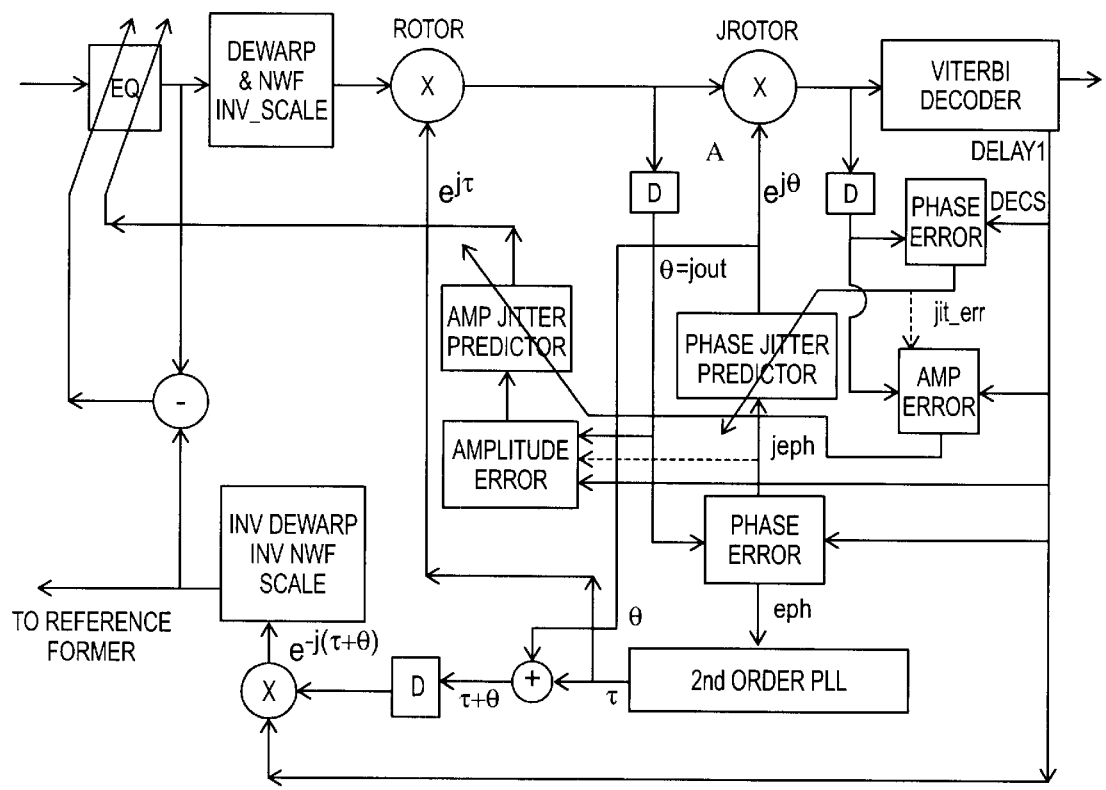
FIG. 21 is a diagram of yet another alternative phase corrector shown in FIGS. 14 and 19.

6. Error Signal for EO Update:

In FIGS. 19 and 21, one has shown two different alternatives for calculating error signal for updating equalizer. In the first figure, the error signal is calculated at the output of noise whitening filter, while in the second figure, the error is computed at the equalizer output. The 2nd approach seems to be ideal, however, this approach may have error propagation problem in the inverse noise whitening filter since it has an IIR structure. Therefore, in actual V.34 implementation, the first approach has been used.

FIG. 22 is an illustration of an exemplary sample command format used in accordance with one aspect of the invention. The preferred command format includes a mnemonic 2200 together with a signal table index 2210 and one or more parameters 2220. The particular mnemonics utilized in generating code for the modem application modules are part of a language that is customized for modem applications. That is, the mnemonics cover commands relating to the various types of signals that need to be generated or processed rather than utilizing general programming commands. An op-code is associated with each mnemonic and the modem functions programmed using the modem specific language as pseudo code can be either interpreted or compiled to run as machine code on the DSP.

A list of high level state machine commands useful in implementing a modem or signal based language is shown in FIG. 23. The command shown in Table 1 provide an extremely powerful language which expresses the generation and recognition of the necessary signals for carrying out a modem protocol. This greatly facilitates development time of modem applications and reduces code size through a terseness of expression that is very powerful.

Figure 24:
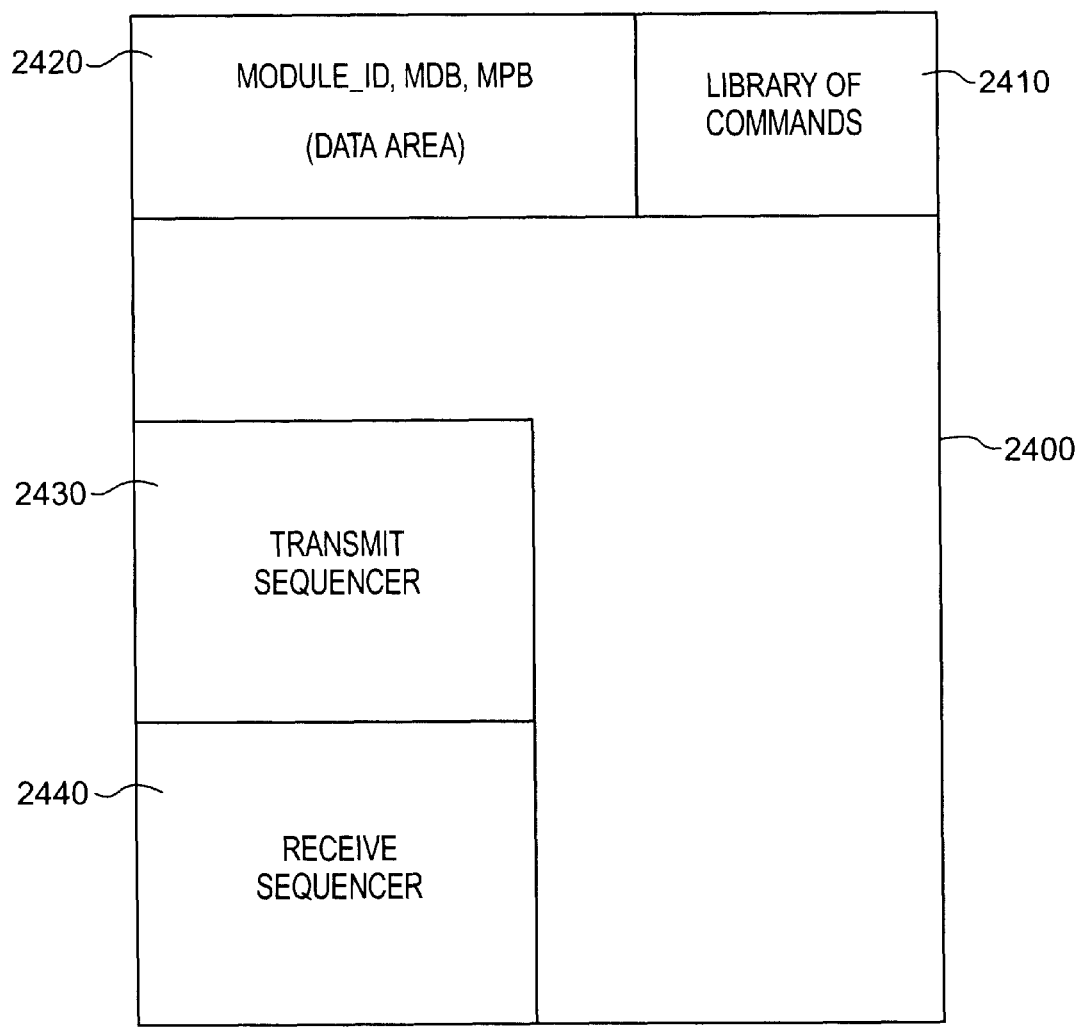
FIG. 24 is a block diagram of the memory space of a DSP in accordance with one aspect of the invention.

FIG. 24 is a block diagram of the memory space of a DSP in accordance with one aspect of the invention. The DSP memory space 2400 includes a library of commands 2410 which specify the actions to be taken by the module when a particular command is asserted. There is a data area 2420 which contains a data structure for each of the modules. The data structure has two components. The first is a parameter portion MPB and the second is a data result portion MDB. As each module is called, the sequencer extracts needed information from the data area and passes an MPB data structure containing the parameters required for the call to the module. The module executes and returns an MDB portion of the data structure containing the results of execution. Thus, all data required for execution of the modem functionality is contained in a separate data area and is selectively extracted for use in execution of the modules. All state information is contained within the data area. Thus, as events occur in the DSP, the contents of particular fields of the data area may change, which then results in changed data when a module is called for execution.

A particularly advantageous way of arranging the programming flow for the DSP when using a modem application involves the way in which the transmit sequencer and receive sequencer are generated. Each of these modules is implemented without any branching. That is, every statement is executed every time in the same sequence. As shown in FIG. 24, as reflected in FIG. 3, the transmit sequencer is executed and then followed by the receive sequencer on a repetitive ongoing basis. Thus, the transmit sequencer will execute every one of its statements and then the receive sequencer will execute every one of its statements and then return to the transmit sequencer for execution of each one of its statements again and so on. The combination of batch processing of symbols, the avoidance of any branching or conditional commands together with the arrangement of all data in a common data area in memory ensures very high performance execution of modem functionality.

Figure 25:
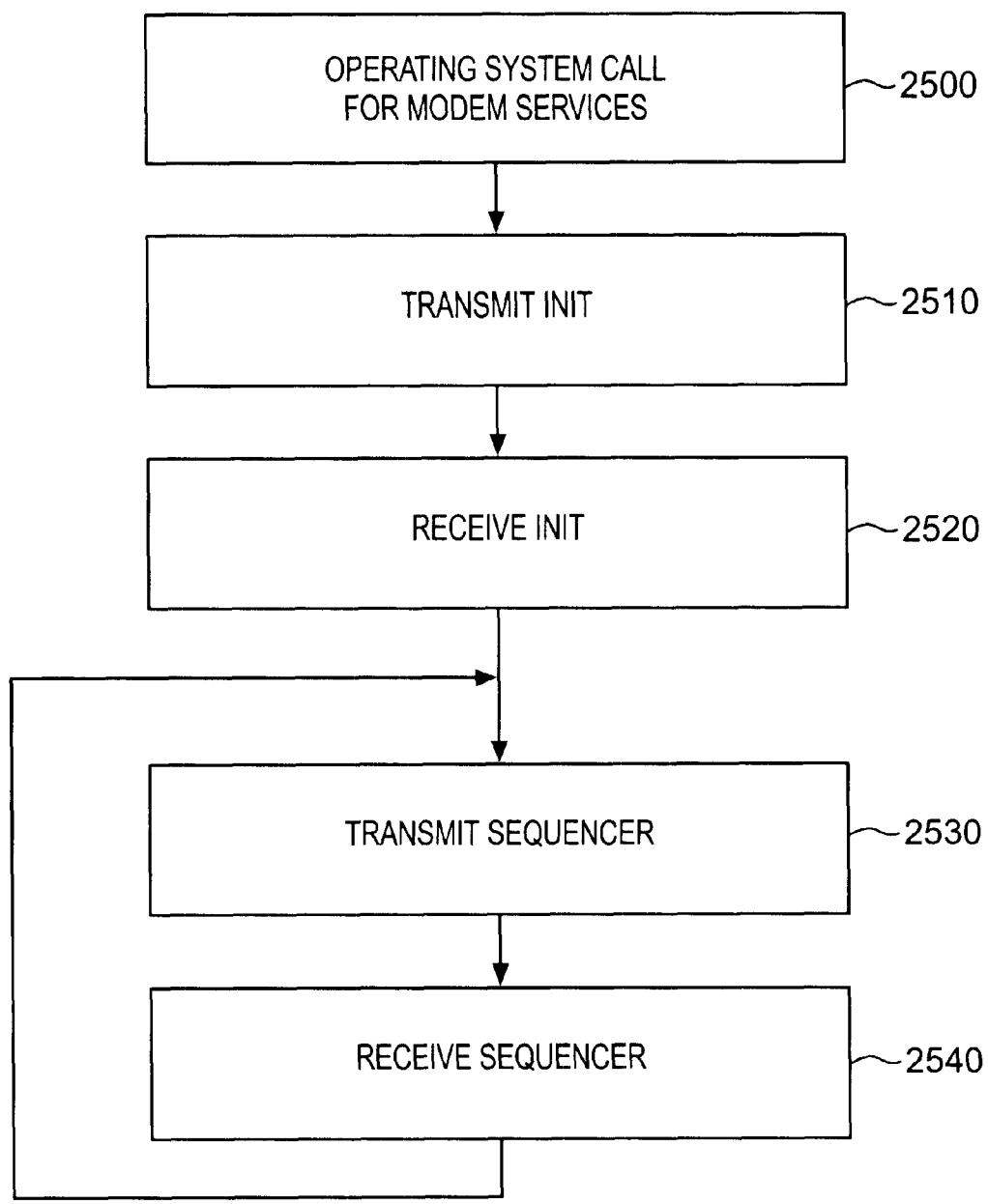
FIG. 25 is a flow chart of a load and execution sequence of modules on a DSP in accordance with one aspect of the invention.

FIG. 25 is a flow chart of a load and execution sequence of modules on a DSP in accordance with one aspect of the invention. When modem services are required on the DSP, it will be initiated by an operating system call (2500). When that occurs, the transmit init module 2510 and the receive init module 2520 will execute setting up the respective sequencers. optionally at this point the transmit and receive init modules have been overwritten or removed from the DSP providing additional memory space. The transmit sequencer 2530 and the receive sequencer 2540 then operate substantially continuously in a loop until the state of the data in the data area indicates that the communications have ended. At which time they will terminate operation.

Figure 26:
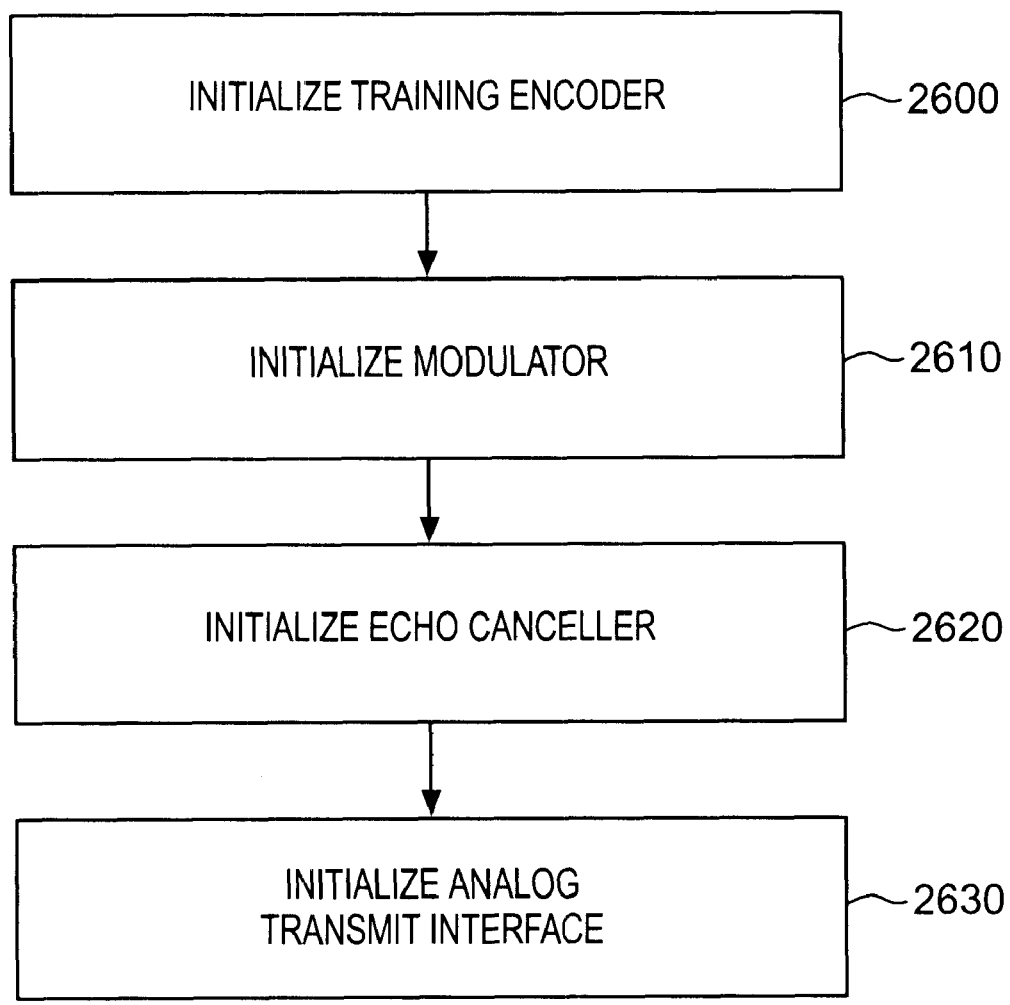
FIG. 26 is a flow chart showing more detail of the transmit init module shown in FIG. 25.

FIG. 26 is a flow chart showing more detail of the transmit init module shown in FIG. 25. When the transmit modules in sequence. It first calls the receive demodulator module. The receive demodulator will check to see if the number of signal samples received is equal to some number N. N can, of course, be 1 but preferably is larger than 1 to permit batch processing of the samples. Then the sequencer calls detect tone to determine whether or not certain tones exist within the incoming signal. Typically, these are control tones such as S used in the V.34 sequences. The sequencer then calls the equalized (2910), recover signal (2915), cancel echo (2920), phase control (2925), parse new state (2930), phase correct update (2935), and disposition of data (2940) in sequence.

Figure 30:
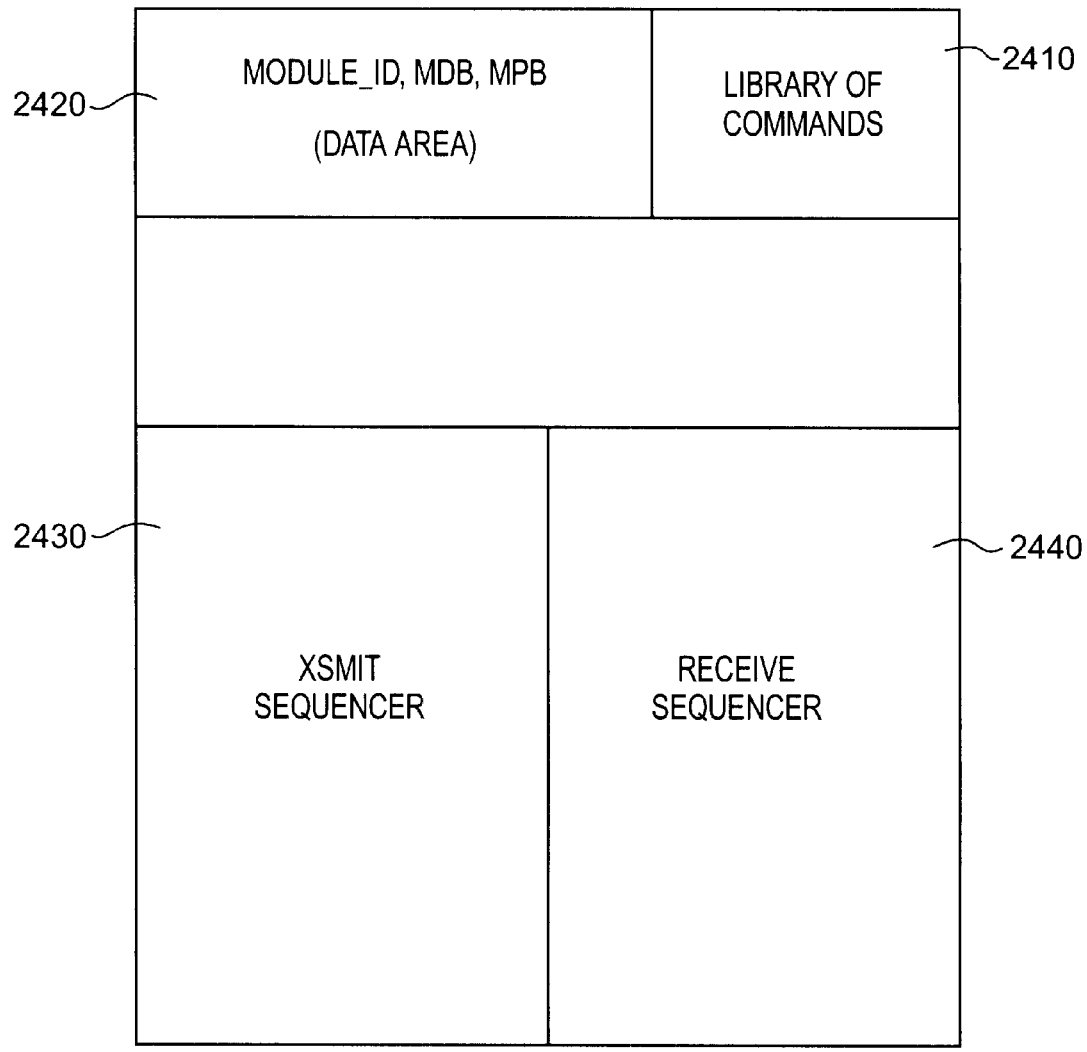
FIG. 30 is a block diagram of an alternative memory space arrangement to that shown in FIG. 24.

FIG. 30 is a block diagram of an alternative memory space arrangement to that shown in FIG. 24. In this arrangement, transmit sequencer 2430 and the receive sequencer 2440 do not operate sequentially but rather in parallel. Synchronization between the two running sequencers is achieved through reference to the data area. It is sometimes the case that, when processing modem sequences such as V.34, that certain symbols or tones must be transmitted until a response is received from the receiver. Thus the transmitter might be transmitting tone of a given duration which can be interrupted when the proper tone or response is received from the receiver. Since the DSP is a multi stream DSP, separate streams can be processed through the transmit sequencer and the receive sequencer so that each can operate relatively independently of the other, except when needed.

Figure 31:
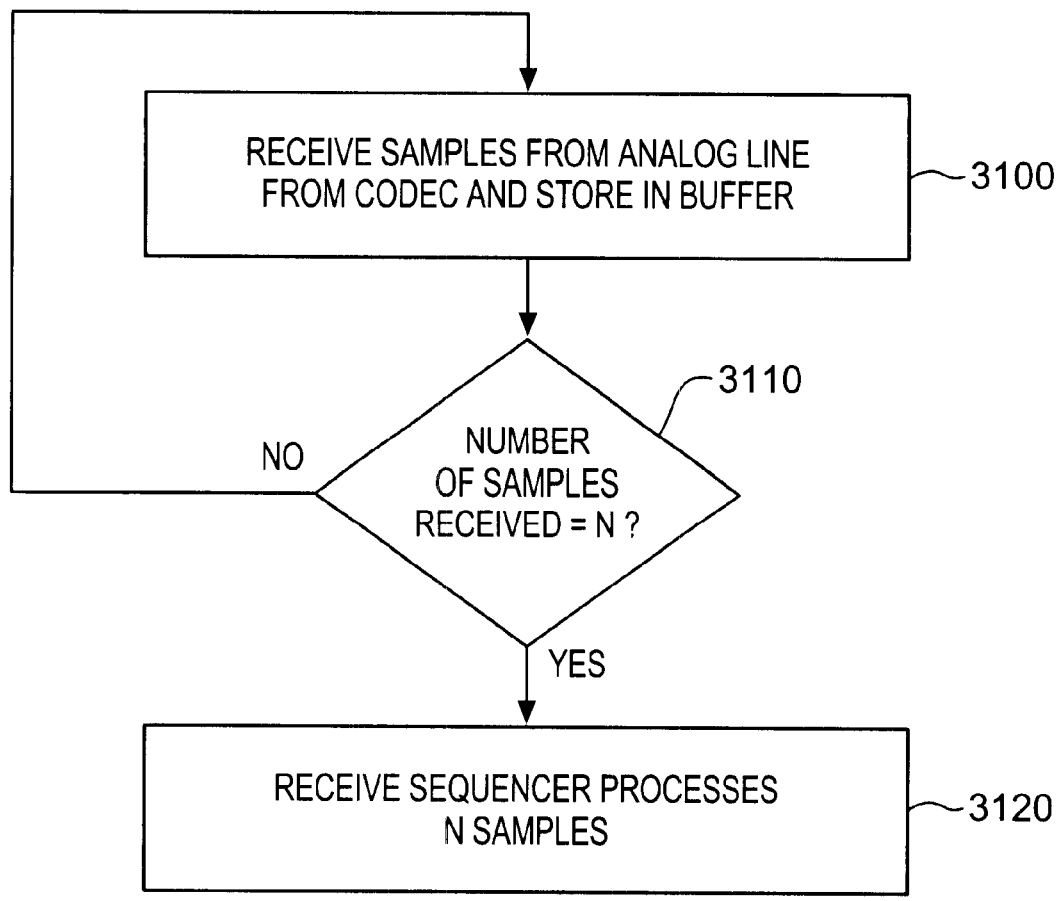
FIG. 31 is flow chart of a process for batch processing of received samples in accordance with one aspect of the invention.

FIG. 31 is flow chart of a process for batch processing of received samples in accordance with one aspect of the invention. As discussed above, the analog signal from the analog line is sampled utilizing a codec and the receive samples are stored in a buffer (3100). Once the number of samples received equal sum value N (3110) the receive sequencer will detect that the number of samples has reached the level required for processing and will process those samples as described above. If the number of samples received init module is called, it will initialize the training encoder (2600), initialize the modulator (2610), initialize the echo canceller (2620) and initialize the analog transmit interface (2630).

The functional modules discussed earlier in conjunction with the operation of a modem are for the most part implemented in software. Thus the initialization of these functional blocks is discussed in FIG. 26 and subsequent figures involves the loading of the software for a particular functional module and setting up the appropriate relationships among the modules so that the modem functions can occur. Some of the modules interface with hardware devices. For example, the codec arrays which provide the samples of signal levels on an incoming analog line and convert digital samples to analog for placement on that line have a hardware aspect to them in that they are initialized and readied for operation by software commands issued from, typically, a device driver or equivalent.

Figure 27:
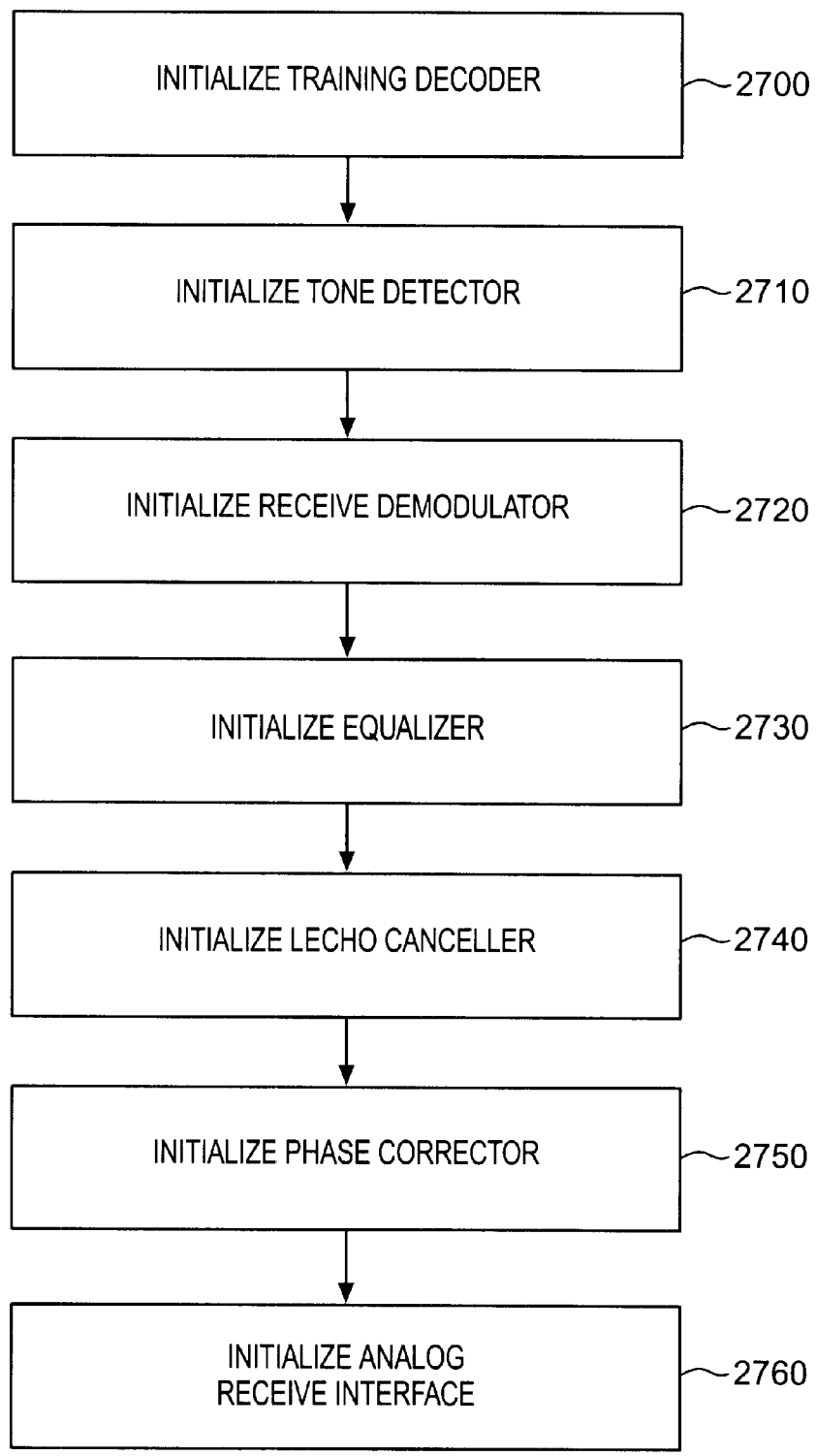
FIG. 27 is a flow chart showing in more detail the receive unit module shown in FIG. 25.

FIG. 27 is a flow chart showing in more detail the receive unit module shown in FIG. 25. When the receive init module is called, it initializes the train decoder (2700), the tone detector (2710), the receive demodulator (2720), the equalizer (2730), the echo canceller (2740), the phase corrector (2750) and the analog receive interface (2760).

Figure 28:
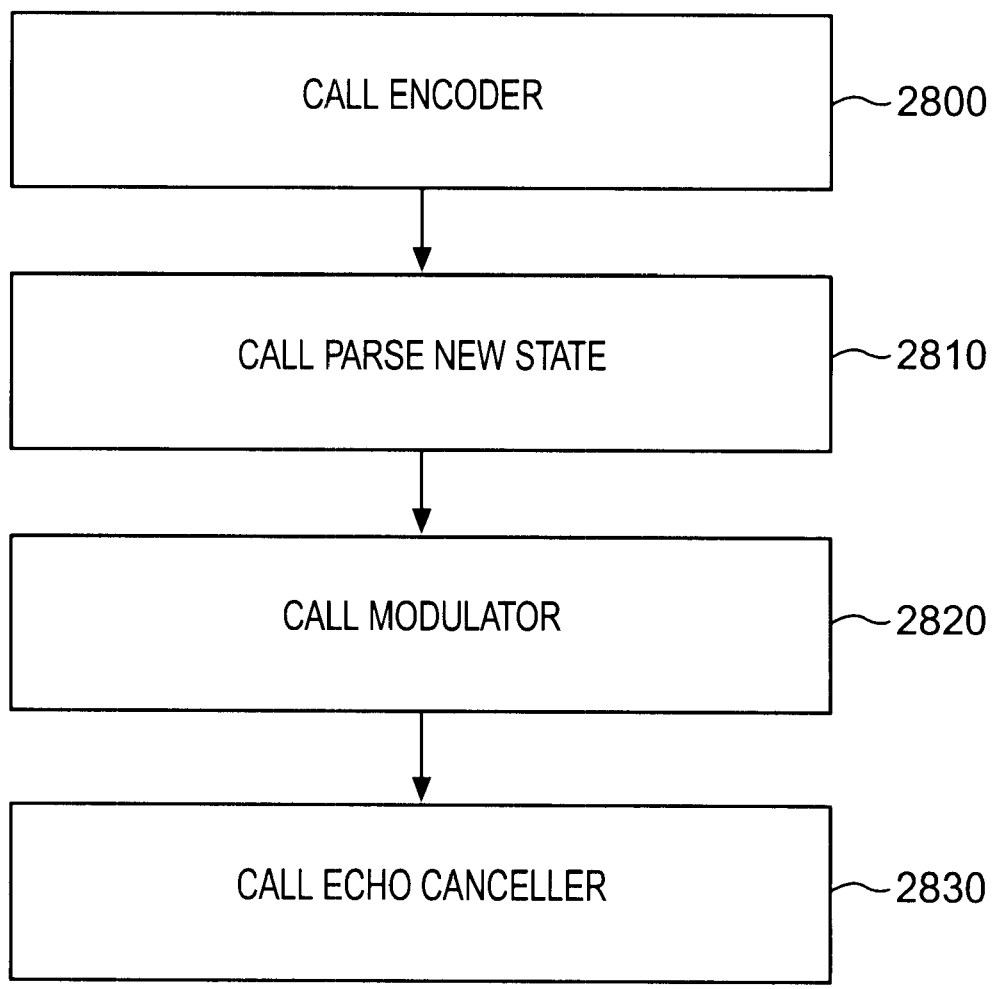
FIG. 28 is a flow chart showing more detail of a Transmit Sequencer shown in FIG. 25.

FIG. 28 is a flow chart showing in more detail the transmit sequencer (TxSequencer) shown in FIG. 25. The transmit sequencer calls the encoder for processing one or more signal samples into symbols for transmission (2800). When that is done, the sequencer checks for a new state (2810) and then calls the modulator (2820) to prepare one or more symbols for transmission (2820). The sequencer then calls the echo canceller to provide the signal values necessary for echo cancellation in the modem (2830).

Figure 29:
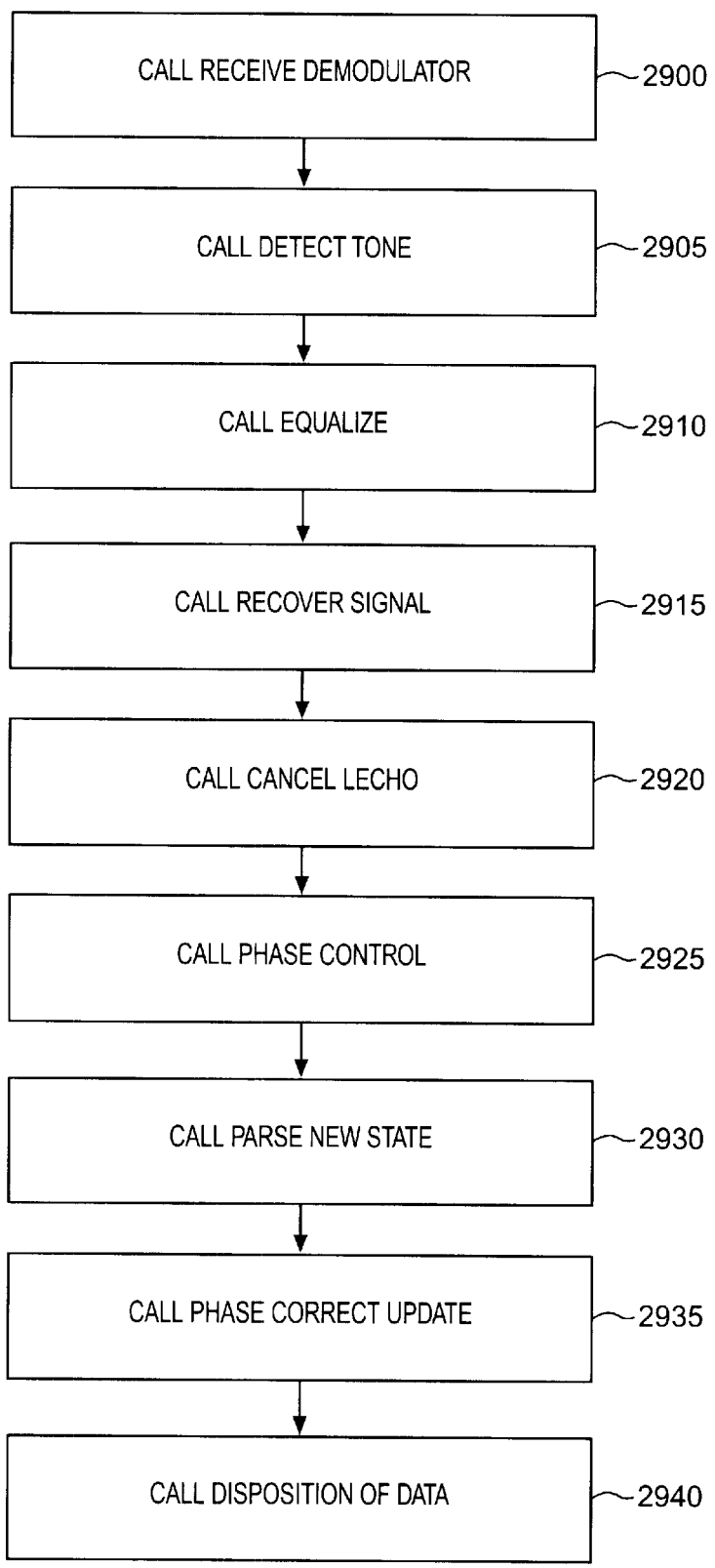
FIG. 29 is a flow chart showing more detail of a Receive Sequencer shown in FIG. 25.

FIG. 29 is a flow chart showing in more detail the receive sequencer (RxSequencer) shown in FIG. 25. Like the transmit sequencer, the receive sequencer calls a plurality of is less then N, the receive sequencer will detect that and no samples will be processed. Although this appears to be a branching operation, in implementation it is not. As the codec is serviced and samples are found in the buffer, the count of samples will be stored in the data area of the DSP and incremented as new samples are received and processed. The receive sequencer will refer to that value. If the value is less than N, subsequent steps will not have arguments and nothing will occur. The next module will then run. However, if the number of samples received is N or more, there will be proper arguments for the code handling the received samples and the samples will be processed as described above.

Figure 32:
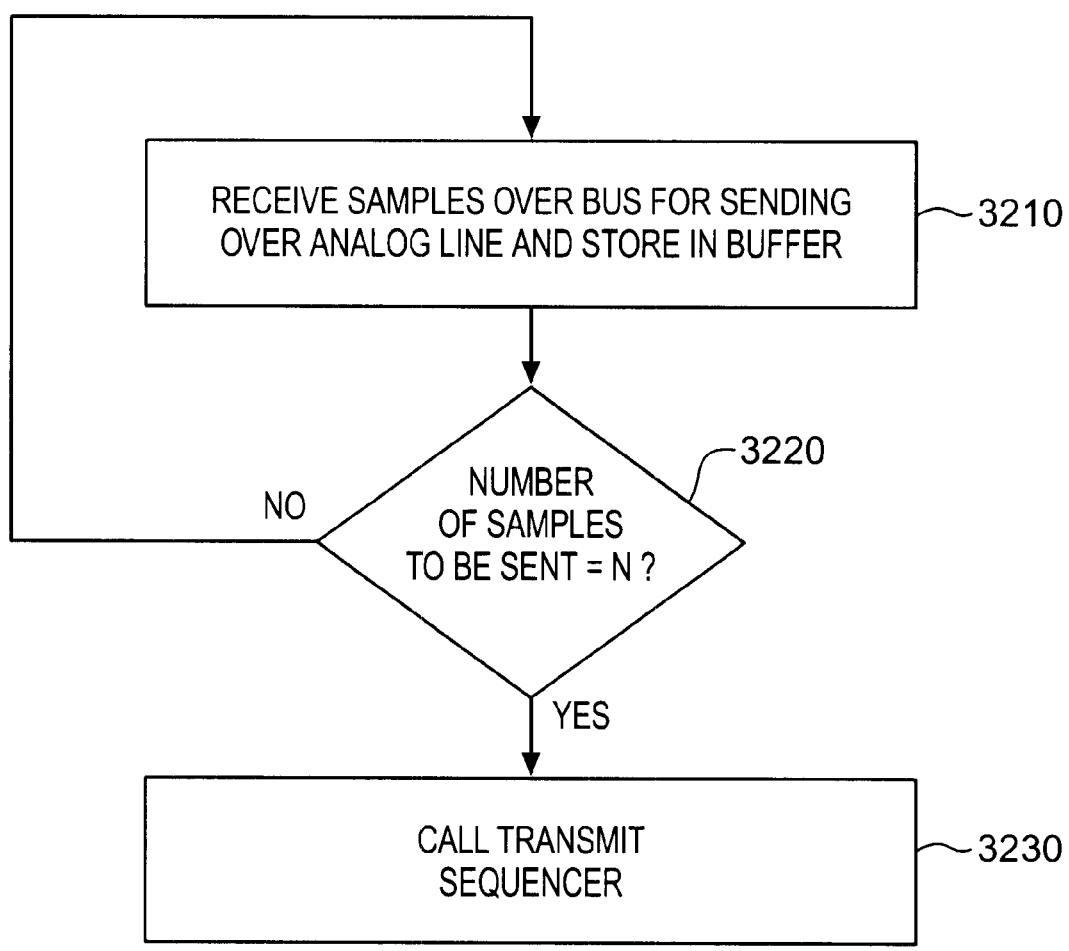
FIG. 32 is a flow chart of a process for batch processing of samples to be transmitted in accordance with one aspect of the invention.

FIG. 32 is a flow chart of a process for batch processing of transmitted samples in accordance with one aspect of the invention. This process is analogous to that described in conjunction with FIG. 31.

Figure 33:
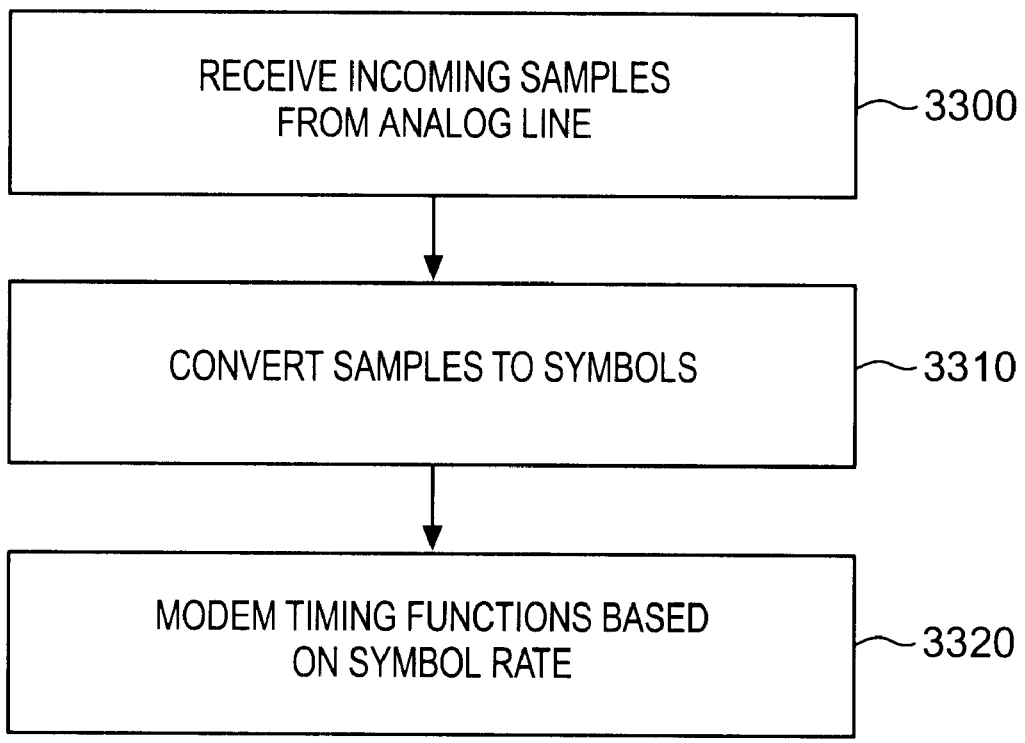
FIG. 33 is a flow chart of a process for controlling modem processing functions based on received symbol rate.

FIG. 33 is a flow chart of a process for controlling modem processing functions based on received symbol rate. As discussed previously, various symbol rates are appropriate to corresponding phases or time intervals of modem operation. For example, in various training phases, the symbol rate is specified to be a fixed value. However, when transmitting data outside of the training phases, the symbol rate is preferably much higher. This is one point where the symbol base language, described previously, has considerable advantages. By structuring the modem functionality in terms of a symbol based language, when incoming samples are received from an analog line (3300) those samples will be converted to symbols (3310). Those symbols can arrive quickly or those symbols can arrive slowly depending on the symbol rate on the communications line. Since the modem functions are based on arriving symbols, the modem processing functions automatically adapt to the symbol rate. If many symbols arrive in a given unit of time, they will be processed quickly. If fewer symbols arrive in a given unit of time, they will be processed more slowly. Thus, the signal processing operations adapt automatically to the incoming symbol rate and execute only when needed based on the arrival of the symbols. Thus, many of the difficulties associated with programming modems to account for various symbol rates are eliminated. The modem processing functions adapt automatically based on symbol rate because of the symbol processing language utilized in the modem code.

Figure 34:
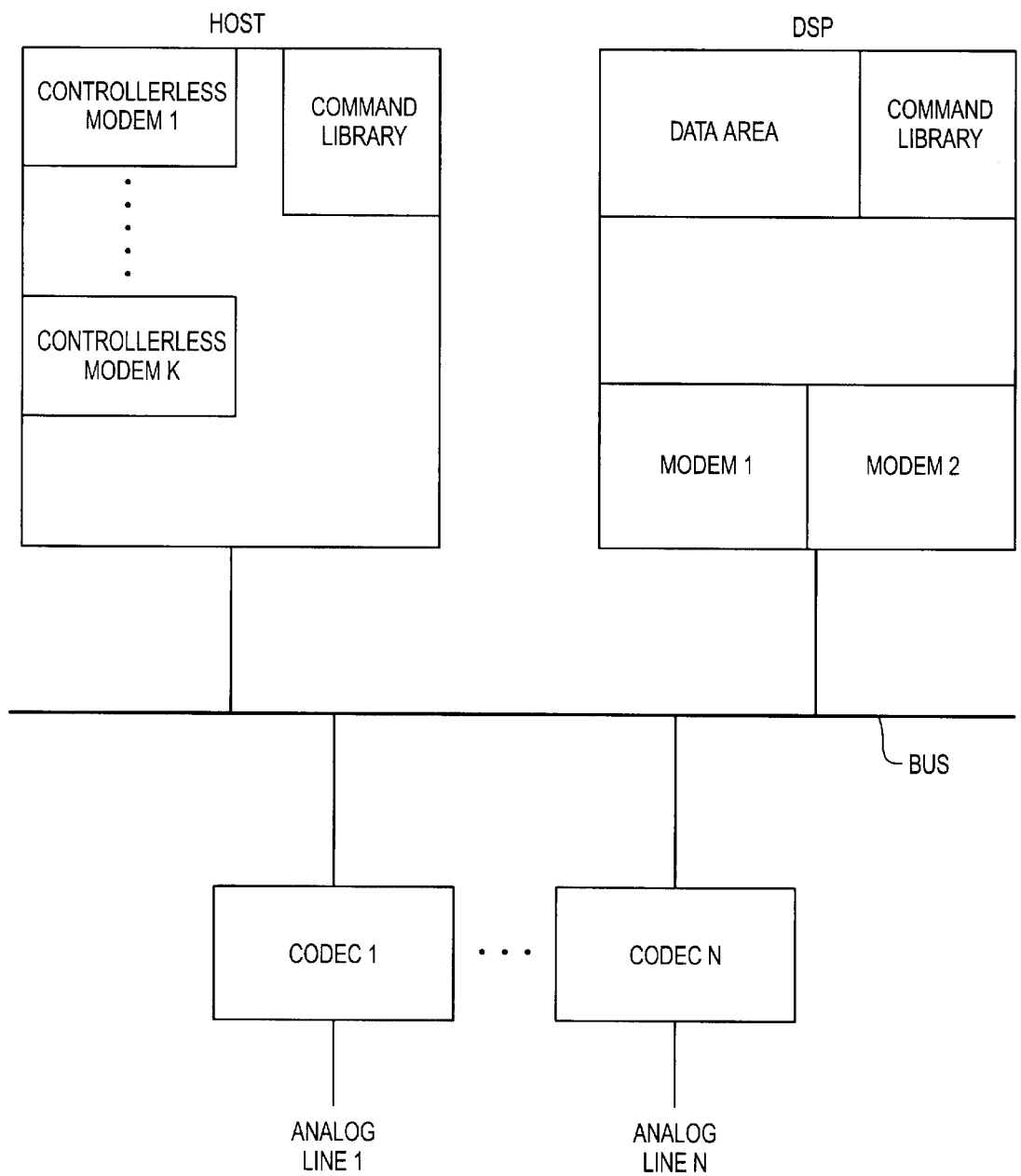
FIG. 34 is a block diagram showing use of both host based controllerless modems and DSP based modems.

FIG. 34 is a block diagram showing use of both host based controllerless modems and DSP based modems.

As discussed in the aforementioned co-pending application, one or more controllerless modems may be resident on the host and operate from the memory space of the host. Similarly, as described herein, one or more modems may be loaded into the DSP and run from the memory space of the DSP. The fact that DMA transfer can be utilized to swap code in and out of the DSP as needed to operate modems suggest that not only individual modules of modem code may be swapped in and out but in fact entire modem code stacks could be swapped in and out of the DSP as required. This creates a very flexible architecture in which a modem can be run either using the host processor or using the DSP. If one desired to use a common language for all modem code, differences in instruction sets for the host and the DSP processors can be accommodated by different command libraries which would handle the common command language mapping to the machine instructions appropriate for the host or the DSP. In this way, a very flexible modem architecture is achieved in which a plurality of communication functions can occur in an ongoing manner using the resources of either the host or the DSP or both.

There has thus been described a number of significant improvements in modem technology which provide both high performance and excellent quality modem processing but ease of design and implementation as well.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. A modem, comprising:
   a processor with a memory that stores instructions for a transmit engine, and a receive engine, which when executed by the processor cause the modem to:
   batch process, by the transmit engine, samples of a first signal to a first set of modulation symbols;
   send the first set of modulation symbols to a device;
   receive, from the device, a second set of modulation symbols;
   batch process, by the receive engine, the second set of modulation symbols to samples of a second signal;
   halt the sending when the transmit engine sends a first predetermined number of modulation symbols to the device; and
   halt the receiving when the receive engine receives a second predetermined number of modulation symbols from the device.

2. The modem according to claim 1 wherein said instructions further cause the modem to:
   sequentially alternate between executing the sending and receiving steps.

3. The modem according to claim 1 wherein said instructions further cause the modem to:
   simultaneously execute, in parallel, the sending and receiving.

4. The modem according to claim 1 wherein said instructions further cause the modem to:
   execute the sending and receiving at a symbol rate that is based on a speed of the modulation symbols arriving from the device.

5. The modem according to claim 1 wherein the sending step further comprises:
   sending, by the transmit sequencer, the signal for a duration equal to a sum of a time for processing a variable number of said symbols and a number of round trip delay times.

6. The modem according to claim 1 wherein the sending further comprises:
   sending, by the transmit engine, the first set of modulation symbols for a specified duration and a number of round trip delay times.

7. The modem according to claim 1 wherein said instructions further cause the modem to:
   set a timer for a specified duration and a number of round trip delay times.

8. A modem, comprising:
   a memory, which stores instructions for a transmit engine, and a receive engine;
   a digital signal processor with a library of commands for the transmit engine and the receive engine, wherein said digital signal processor is coupled to said memory to implement modem operations and wherein said commands cause the modem to:
   batch process, by the transmit engine, samples of a first signal to a first set of modulation symbols;
   send the first set of modulation symbols to a device;
   receive, from the device, a second set of modulation symbols;
   batch process, by the receive engine, the second set of modulation symbols to samples of a second signal;
   halt the sending when the transmit engine sends a first predetermined number of modulation symbols to the device; and
   halt the receiving when the receive engine receives a second predetermined number of modulation symbols from the device.

9. The modem according to claim 8 wherein said commands further cause the modem to:
   sequentially alternate between executing the sending and receiving.

10. The modem according to claim 8 wherein said commands further cause the modem to:
    simultaneously execute in parallel the sending and receiving.

11. The modem according to claim 8 wherein said commands further cause the modem to:
    execute the sending and receiving at a symbol rate which is based on a speed of the modulation symbols arriving from the device.

12. A method of operating a modem, comprising:
    batch processing, by a transmit engine, samples of a first signal to a first set of modulation symbols;
    sending the first set of modulation symbols to a device;
    receiving, from the device, a second set of modulation symbols;
    batch processing, by a receive engine, the second set of modulation symbols to samples of a second signal;
    halting the sending when the transmit engine sends a first predetermined number of modulation symbols to the device; and
    halting the receiving when the receive engine receives a second predetermined number of modulation symbols from the device.

13. The method according to claim 12 further comprising:
    sequentially alternating between executing the sending and receiving.

14. The method according to claim 12 further comprising:
    simultaneously executing in parallel the sending and receiving.

15. The method according to claim 12 further comprising:
    executing the sending and receiving at a symbol rate which is based on a speed of the modulation symbols arriving from the device.

16. A computer-readable medium for implementing modem operations for a modem, the medium storing instructions, which when executed by a processor cause the modem to:
    batch process, by the transmit engine, samples of a first signal to a first set of modulation symbols;
    send the first sets of modulation symbols to a device;
    receive, from the device, a second set of modulation symbols;
    batch process, by the receive engine, the second set of modulation symbols to samples of a second signal;
    halt the sending when the transmit engine sends a first predetermined number of modulation symbols to the device; and halt the receiving when the receive engine receives a second predetermined number of modulation symbols from the device.

17. An apparatus comprising:

means for batch processing samples of a first signal to a first set of modulation symbols;

means for sending the first set of modulation symbols to a device;

means for receiving, from the device, a second set of modulation symbols;

means for batch processing the second set of modulation symbols to a second signal;

means for halting the sending means when the sending means sends a first predetermined number of modulation symbols to the device; and means for halting the receiving means when the receiving means receives a second predetermined number of modulation symbols from the device.

18. The apparatus according to claim 17 further comprising:

means for sequentially alternating between executing the sending and receiving steps.

19. The apparatus according to claim 1 further comprising:

means for executing the sending and receiving at a symbol rate that is based on a speed of the modulation symbols arriving from the device.

* * * * *

UNITED STATES PATENT AND TRADEMARK OFFICE
CERTIFICATE OF CORRECTION

PATENT NO.    : 6,490,628 B2
DATED         : December 3, 2002
INVENTOR(S)   : Hindie et al.

It is certified that error appears in the above-identified patent and that said Letters Patent is hereby corrected as shown below:

Column 9,
Move text starting from line 5, "Dewarp, NWF" to line 32 "is used to update the equalizer taps" to column 8, after line 39 "phase corrector.".

Column 15,
Move text starting from line 35, "init module is called, it will initialize the training" to line column 16, line 3 "transmit sequencer, the receive sequencer calls a plurality of" to
column 14, line 65, after "When the transmit".

Signed and Sealed this

Twenty-first Day of October, 2003

JAMES E. ROGAN
*Director of the United States Patent and Trademark Office*